United States Patent [19]

Förster

[11] Patent Number: 5,699,885
[45] Date of Patent: Dec. 23, 1997

[54] VIBRATION DAMPER WITH ADJUSTABLE DAMPING FORCE

[75] Inventor: Andreas Förster, Schweinfurt, Germany

[73] Assignee: Fichtel & Sachs AG, Schweinfurt, Germany

[21] Appl. No.: 499,065

[22] Filed: Jul. 6, 1995

Related U.S. Application Data

[63] Continuation-in-part of Ser. No. 214,615, Mar. 17, 1994, Pat. No. 5,551,541.

[30] Foreign Application Priority Data

| Mar. 18, 1993 | [DE] | Germany | 43 08 603.9 |
| Feb. 26, 1994 | [DE] | Germany | 44 06 373.5 |
| Mar. 3, 1994  | [DE] | Germany | 44 06 918.9 |
| Jul. 7, 1994  | [DE] | Germany | 44 23 526.7 |

[51] Int. Cl.⁶ ........................ F16F 9/34
[52] U.S. Cl. ........................ 188/317; 188/322.15
[58] Field of Search .............. 188/322.15, 312, 188/316, 317, 319

[56] References Cited

U.S. PATENT DOCUMENTS

| 3,365,033 | 1/1968 | Willich ............... 188/322.15 X |
| 3,756,357 | 9/1973 | Graff et al. ........... 188/317 X |
| 5,150,775 | 9/1992 | Charles et al. ......... 188/322.15 X |

FOREIGN PATENT DOCUMENTS

| 0200446 | 11/1986 | European Pat. Off. . |
| 0400395 | 12/1990 | European Pat. Off. . |
| 0572040 | 12/1993 | European Pat. Off. . |
| 0608427 | 8/1994  | European Pat. Off. . |
| 2282071 | 3/1976  | France . |
| 4016807 | 1/1991  | Germany . |
| 4219141 | 12/1992 | Germany . |
| 4406918 | 9/1994  | Germany . |
| 2075152 | 11/1981 | United Kingdom ...... 188/322.15 |
| 89/12183 | 12/1989 | WIPO .................. 188/319 |

*Primary Examiner*—Peter M. Poon
*Attorney, Agent, or Firm*—Nils H. Ljungman and Associates

[57] ABSTRACT

Vibration damper with adjustable damping force, comprising a pressure tube filled with damping medium, in which a piston on an axially movable piston rod divides a work chamber into a chamber closer to the piston rod and a chamber farther from the piston rod, whereby there is a flow of damping medium between the two work chambers, which flow is divided into a main stream and side stream, a damping valve device consisting of a damping valve body with one main damping valve in each direction of flow, each of which is formed by a main stage valve body and a pilot stage valve which actuates the main stage valves, an adjustable actuator which controls a flow connection between a control chamber and a work chamber, and the main stage valve carries the flow of the main stream and the pilot stage valve carries the flow of the side stream in both directions of flow, characterized by the fact that the side stream in the pilot, stage valve flows through a non-return valve system, that the pilot stage valve has two control cross sections which can be controlled in alternation, and the side stream, as a function of the direction of flow, passes a control cross section and a non-return valve which opens in the direction of flow.

18 Claims, 20 Drawing Sheets

VIBRATION DAMPER WITH ADJUSTABLE DAMPING FORCE

CROSS-REFERENCE TO RELATED APPLICATION

The present application is a continuation-in-part of copending U.S. patent application Ser. No. 08/214,615, filed on Mar. 17, 1994 now U.S. Pat. No. 5,551,541, by Andreas Förster and entitled "Shock Absorber".

BACKGROUND OF THE INVENTION

1. Field of the Invention

The present invention generally relates to a vibration damper with adjustable damping force, comprising a pressure tube filled with damping medium, in which a piston on an axially movable piston rod divides a work chamber into a chamber closer to the piston rod and a chamber farther from the piston rod, whereby there is a flow of damping medium between the two work chambers which is divided into a main flow or stream, and a side flow or stream. There is a damping valve device including a damping valve body with one main damping valve in each direction of flow, each of which is formed by a main stage valve body and a pilot stage valve which actuates the main stage valves. Further, there is an adjustable actuator which controls a flow connection between a control chamber and a work chamber, and the main stage valve carries the flow of the main stream and the pilot stage valve carries the flow of the side stream in both directions of flow.

2. Background Information

A vibration damper of the type described above is disclosed in Federal Republic of Germany Patent Application No. 44 06 918 (corresponding to commonly assigned and copending U.S. patent application Ser. No. 08/214,615).

The vibration damper recited in claim 1 of the above-cited German application, and shown in the embodiments illustrated in FIGS. 7 and 8 of the above-cited German application, contains a damping valve device which performs the damping force adjustment on the basis of a "skyhook" principle. A damping force adjustment is thereby performed in which the damping force alternately increases or decreases. If the damping force increases for one direction of flow, it is reduced or maintained for the other direction of flow. In this process, several control edges are used which throttle the side stream. These throttle edges should preferably have relatively close manufacturing tolerances, so that there are essentially no incorrect adjustments of the damping force.

OBJECT OF THE INVENTION

The object of the present invention is to improve upon the vibration damper described in Federal Republic of Germany Patent Application No. 44 06 918 and its damping valve device, so that the result is a space-saving damping valve device which has a simple construction and an operating action which is independent of leakage losses, as well as a damping force action which is independent of manufacturing tolerances.

SUMMARY OF THE INVENTION

The present invention teaches that the above object can be achieved, in accordance with at least one preferred embodiment by means of an arrangement in which: the side stream in the pilot stage valve flows through a non-return valve system; the pilot stage valve has two control cross sections which can be controlled in alternation; and the side stream, as a function of the direction of flow, passes a control cross section and a non-return valve which opens in the direction of flow.

Preferably, the number of control cross sections is limited with respect to the vibration dampers disclosed in Federal Republic of Germany Patent Application No. 44 06 918, so that given the same manufacturing quality, the sensitivity to manufacturing tolerances of the vibration damper, and in particular of the damping valve device, can be reduced.

In an additional advantageous configuration, the control cross section of the pilot stage valve is preferably formed by a seat surface in combination with a cone surface, and an additional flow cross section is preferably connected to the control cross section. As soon as one control cross section is active for the one direction of flow, the other control section for the opposite direction of flow is bridged or bypassed by the flow cross section.

The flow cross section essentially determines the damping force setting of the damping valve device for the damping medium in one flow direction, which does not pass through the control cross section. Nevertheless, to be able to adjust the damping valve device, the flow cross section can be adjusted by means of the actuator travel.

The damping valve device is preferably advantageously realized so that there is a flow connection between the two control cross sections, so that two partial lengths or segments of the flow cross section are formed, each of which is active as a function of the direction of flow. The damping force characteristic is preferably always defined by the smallest cross section. So that the control cross section is active for the one direction of flow and inactive for the other direction of flow, the damping medium can bridge or bypass a control cross section by means of the flow connection.

The two partial lengths of the flow cross sections thereby preferably have different shapes. Consequently, the damping valve device can be used as a function of the direction of flow, by means of the flow cross sections. For example, if the control cross section for the compression direction lies in the active area, the active flow cross section can be set to produce a hard damping characteristic. In the opposite direction of flow, the flow cross section can be set to a soft damping characteristic, to emphasize comfort. Dependencies on the direction of flow can be achieved by means of the flow cross section, e.g. if the flow cross sections are connected to one another by means of a graduation, or graduated arrangement.

As disclosed in an additional advantageous embodiment, each of the two flow cross sections can be adjusted within their partial lengths as a function of the actuator travel.

As a function of the direction-of flow, if both control cross sections are disengaged when the actuator is in an intermediate position, the flow cross section can provide the desired adjustment of the damping force, depending on the sizing of the components. It is thereby altogether possible to set a medium or hard damping force characteristic for a specific vehicle. Alternatively, in an intermediate actuator position, both control cross sections can be disengaged, and the flow cross section can provide a soft damping force setting. In this setting of the damping valve device, none of the control edges are engaged, so that essentially no variations of the damping force can occur.

The present invention teaches that the damping valve device is preferably set hard, in the electrically currentless position, in the decompression direction, and is set soft in the compression direction. Such a setting represents a good compromise which, in spite of a comfortable setting in the compression direction, keeps the wheel movements to a reasonable level by means of a hard setting in the decompression direction.

With regard to a particularly simple design of the valve device, the side stream preferably continues to flow into the control chamber after it has flowed through one of the non-return valves. The flow path is thereby short and can be realized easily.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in a shock absorber comprising: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the cylinder into first and second chambers; means for permitting fluid communication between the first and second chambers; the means for permitting fluid communication being disposed in at least a portion of the piston, the means for permitting fluid communication comprising: a first spring-loaded main stage valve body; a second spring-loaded main stage valve body; a control chamber being defined between the first main stage valve body and the second main stage valve body; first inlet means for directing fluid from the first chamber to the control chamber through the first main stage valve body upon axial displacement of the piston in a first direction; second inlet means for directing fluid from the second chamber to the control chamber through the second main stage valve body upon axial displacement of the piston in a second direction, the second direction being opposite the first direction; means for permitting axial displacement of: the first main stage valve body towards the second main stage valve body during flow of damping fluid through the first inlet means; and the second main stage valve body towards the first main stage valve body during flow of damping fluid through the second inlet means.

Another aspect of the invention resides broadly in a shock absorber comprising: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the cylinder into first and second chambers; means for permitting fluid communication between the first and second chambers; the means for permitting fluid communication being disposed in at least a portion of the piston, the means for permitting fluid communication comprising: a first main stage valve body; a second main stage valve body; a control chamber being defined between the first main stage valve body and the second main stage valve body; first inlet means for directing fluid from the first chamber to the control chamber through the first main stage valve body upon axial displacement of the piston in a first direction; second inlet means for directing fluid from the second chamber to the control chamber through the second main stage valve body upon axial displacement of the piston in a second direction, the second direction being opposite the first direction; a pilot stage valve configured for activating the first and second main stage valves; the pilot stage valve comprising: at least one non-return valve; and at least one control cross-section; the pilot stage valve being configured to permit the side flow to pass through at least a portion of each of: the at least one non-return valve; and the at least one control cross-section; as a function of the direction of the side flow.

Yet another aspect of the invention resides broadly in a method of operating a shock absorber, the shock absorber comprising: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the cylinder into first and second chambers; the method comprising the steps of: providing means for permitting fluid communication between the first and second chambers; disposing the means for permitting fluid communication in at least a portion of the piston; the step of providing the means for permitting fluid communication comprising the steps of: providing a first spring-loaded main stage valve body; providing a second spring-loaded main stage valve body; defining a control chamber being between the first main stage valve body and the second main stage valve body; providing first inlet means for directing fluid from the first chamber to the control chamber through the first main stage valve body upon axial displacement of the piston in a first direction; providing second inlet means for directing fluid from the second chamber to the control chamber through the second main stage valve body upon axial displacement of the piston in a second direction, the second direction being opposite the first direction; providing means for permitting axial displacement of the first main stage valve body towards the second main stage valve body during flow of damping fluid through the first inlet means; and providing means for permitting axial displacement of the second main stage valve body towards the first main stage valve body during flow of damping fluid through the second inlet means; the method further comprising the additional steps of: displacing the piston in the first direction; performing the following steps during displacement of the piston in the first direction: directing fluid, with the first inlet means, from the first chamber to the control chamber through the first main stage valve body; and axially displacing the first main stage valve body towards the second main stage valve body; displacing the piston in the second direction; and performing the following steps during displacement of the piston in the second direction: directing fluid, with the second inlet means, from the second chamber to the control chamber through the second main stage valve body; and axially displacing the second main stage valve body towards the first main stage valve body.

BRIEF DESCRIPTION OF THE DRAWINGS

The invention is explained in greater detail below with reference to the embodiments illustrated in the accompanying drawings, wherein.

DESCRIPTION OF THE PREFERRED EMBODIMENT

Figure 1:
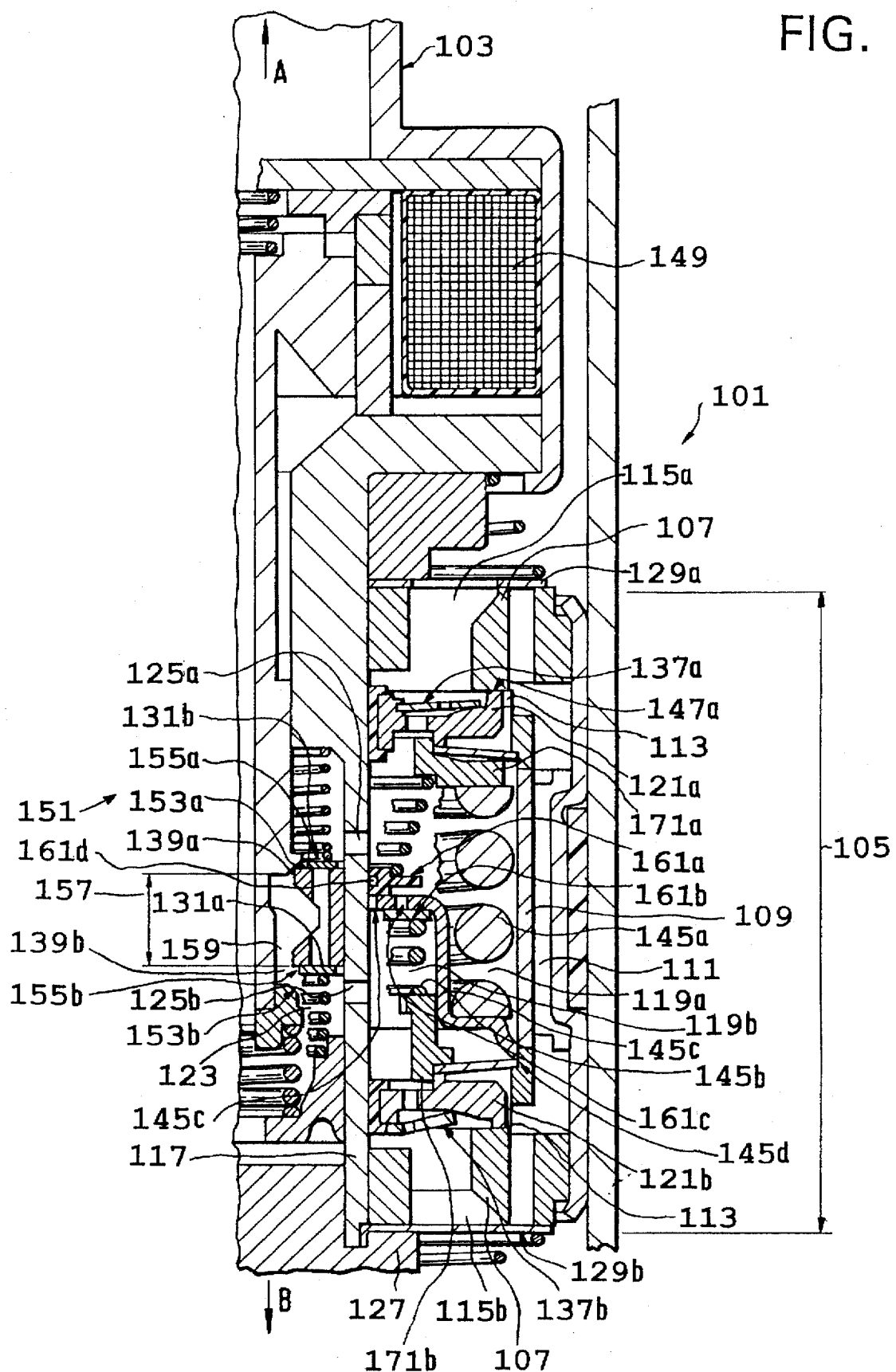
FIG. 1 shows an overall view of a damping valve device.

FIG. 1 is limited to an illustration of a damping valve device 101 on a hollow piston rod 103. The damping valve device 101 preferably comprises, among other things, a damping valve housing 105 which has a damping valve head body 107 on each end, and between them a damping valve intermediate body 109. The damping valve intermediate body 109 and the damping valve head bodies 107 preferably have connecting passages 111 which have radial connections as an inflow 113 to inlet openings 115a/b. Radially farther inward, in relation to the connecting passages, a neck or journal segment 117 of the piston rod 103, with the damping valve intermediate body 109, preferably forms two control chambers 119a/b, each of which is delimited axially by a main stage valve body 121a/b. Coaxial to the control chambers 119a/b, there is preferably a pilot chamber 123 which is connected by means of radial flow connections 125a/b to the control chambers 119a/b. The entire damping valve device 101 is preferably braced on the piston rod 103 by means of a nut 127. The damping valve device 101 preferably has a series of non-return valves which control the flow conditions inside the damping valve device 101. On one hand, the outlet openings of the connecting passages are preferably provided with non-return valves 129a/b. Each main stage valve body 121a/b is preferably equipped with a directionally-dependent valve 137a/b which controls the flow into and out of the control chamber 119a/b.

Inside the antechamber, or pilot chamber, 123, there is preferably an armature 151 which can be displaced axially by means of a magnet coil 149. The armature 151 preferably has control cross sections 139a/b which control a connection between the control chambers 119a/b by means of the radial flow connections 125a/b.

In the event of a movement of the damping valve device 101 in direction A, the damping medium must generally be displaced, whereupon it flows into the inflow opening 115a. Inside the inflow opening 115a, the medium is preferably divided into a main stream and a side stream. The side stream preferably flows through the main stage valve body 121a and the valve 137a into the control chamber 119a. As a function of the passage cross section 139a, a pressure can essentially build up in the control chamber 119a, and this pressure exerts a closing force on the main stage valve body 121a. The closing force is preferably assisted by the force of a closing spring 145a. If the opening force in the vicinity of the inflow opening 115a is greater than the closing force of the control chamber 119a, the main stage valve body 121a rises from a valve seat 147a, whereby the inflow 113 into the connecting passages 111 is opened.

Preferably, in accordance with at least one preferred embodiment of the present invention, valve 137a, as well as valve 137b, may be embodied by any suitable valve arrangement capable of performing the functions described. Conceivably, valves 137a/b may include a type of slotted valve disc or a pressure control valve, examples of both of which will be well-known to those of ordinary skill in the art.

The discharge from the control chamber 119a preferably takes place by means of the adjustable pilot stage valve and by means of a non-return valve 131a which is connected by means of the flow connection 125b to the control chamber 119b, and from which the side stream preferably flows out by means of the directional valve 137b.

During the stroke movement described above, non-return valve 129a preferably closes the connecting passages 111 so that the control chamber 119a is not bypassed.

In the event of a stroke movement in the direction B, non-return valve 129b preferably closes. The damping medium preferably passes the valve 137b and builds up the closing force for the main stage valve body 121b. The side stream flows out via the control chamber 119b. The main stream then flows, after the lifting of the main stage valve body 121b (which, like the main stage valve body 121a, is centered on the neck segment 117) in the connecting passages 111.

Thus, in accordance with at least one preferred embodiment of the present invention, with a stroke movement in the direction B, the adjustable pilot stage valve will allow significant side flow so as to promote the lifting of main stage valve body 121b.

The damping force of the damping valve device 101 can essentially be defined by the magnitude of the control cross section 139a/b, whereby basically the outflow of the respective control chamber 119a/b is used to modify the damping force for both directions of flow.

To set the damping valve device in the opposite direction, cone surfaces 153a/b, coupled alternately by means of the armature 151, are preferably used in connection with seat surfaces 155a/b. The side stream thereby passes through one of the respective non-return valves 131a/b which bypass the control cross section 139a/b. A respective non-return valve 131a/b preferably lies in the flow path of the side stream with a control cross section 139a/b.

Between the cone surfaces 153a/b, the armature 151 preferably has access to a longitudinal segment 157 which, together with the seat surfaces 155a/b, can define a circular ring-shaped flow cross section 159. If one of the two cone surfaces 153a/b forms a control cross section 139a/b with the corresponding seat surface 155a/b, the other cone surface is preferably sufficiently far away from the corresponding seat surface so that no throttling effect occurs at this point. The cross section is preferably defined by the diameter of the length segment 157 and the seat surface 155a/b. The flow cross section 159 thereby essentially has, or provides, a flow connection to the two non-return valves 131a/b. The two non-return valves 131a/b are preferably switched in parallel by means of the flow cross section 159 and the connection of the two control cross sections.

So that a soft damping force setting can also be realized for both directions of flow, both control cross sections 139a/b can be disengaged when the armature is in an intermediate position. Then, essentially only the low-throttling passage cross section 159 will be active between the cone surfaces 153a/b of the actuator.

For a further adaptation of the damping force to the flow directions, two closing springs 145a, 145b are preferably used which, on account of their particular location, will essentially not be related in any way to the spring forces for the main stage valve bodies 121a, 121b. A spring guide sleeve 145c, which is located in a stationary fashion on the damping valve intermediate body 109, preferably acts as a support mechanism for the two springs 145a and 145b, so that the spring forces do not interfere with or influence one another. In this illustration, the bias force of the closing spring 145a is preferably several times greater than that of the closing spring 145b; on the basis of experience, it is preferably greater by a factor of approximately 4, so that the closing spring 145a preferably defines the position of the spring guide sleeve 145c on a shoulder 145d of the damping valve housing 105. Alternatively, the spring guide sleeve 145c can also be braced between a damping valve head body 107 and the damping valve intermediate body 109. The closing springs 145a/b are preferably engaged with the main stage valve bodies 121a/b by means of support bodies 171a/b.

To limit the pressure of the entire damping valve device, non-return valves 161a/b preferably are used which open and close at least one overflow opening 161c in the spring guide sleeve 145c as a function of the direction. The non-return valves are preferably embodied by spring-loaded closing bodies 161a. In the event of an overpressure in the control chamber 119a, cover disc 161b in the control chamber 119b can lift up and permit a pressure reduction via the control chamber 119b. In the reverse case, the closing body 161a preferably lifts up from the spring guide sleeve 145c and opens a ring-shaped cross section 161d between the piston rod neck 117 and the spring guide sleeve 145c.

Figure 2:
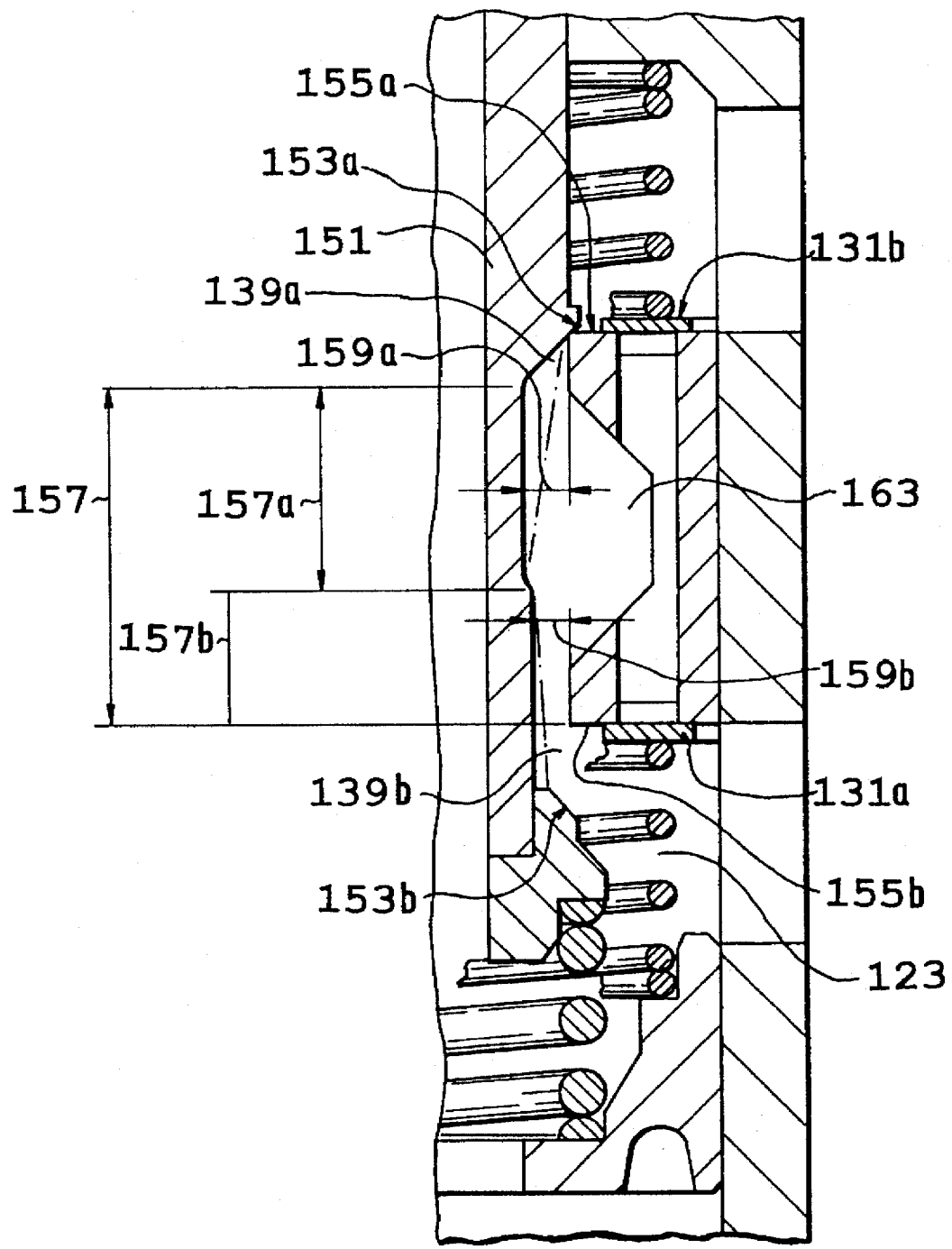
FIG. 2 shows a detail of the pilot valve.

FIG. 2 is an enlarged detail of the vicinity of the pilot stage valve 123 to illustrate the operation of the flow cross section 159. Basically, the smallest discharge cross section in the pilot stage valve 123 (cross section 139a/b or flow cross section 159) will essentially determine the damping force setting of the damping valve device, by means of a decrease in the pressure in the respective control chambers (119a/b, FIG. 1). As explained above with reference to FIG. 1, preferably only one control cross section 139a/b is engaged at any given time. For the other direction of flow, the flow cross section 159 is the determining factor. In other words, the flow cross section preferably determines the damping force setting for the one direction, and the control cross section preferably determines the damping force setting for the other direction, in this concrete example the cross section 139a/b.

As also shown in FIG. 2, the flow cross section 159, in two segments 157a/b, is shown as being divided into the individual flow cross sections 159a/b, which are separated from one another by means of a shoulder. In this case, the flow cross sections 159a/b are constant inside their partial lengths 157a/b. That means that an adjustment of the control cross section would not entail any change of the flow cross section, so that the damping force setting changes for the one direction of operation and remains constant for the other direction.

But, as shown by the broken lines, the flow cross sections 159a/b can also be designed so that they are independent of the travel, if, as shown by way of example, the contour of the armature 151 is slightly conical. In this variant embodiment, the damping force setting in both directions is changed by means of the armature travel. The two flow cross sections 159a/b are preferably hydraulically separated from one another by flow connection 163, so that one partial length 157a corresponds to the decompression direction and the other partial length 157b corresponds to the compression direction.

Summarizing, in accordance with at least one preferred embodiment of the present invention, armature 151 may be selectively switched so as to engage or disengage one or more of control cross-sections 139a/b. In FIG. 1, control cross-section 139a is shown as being closed with control cross-section 139b being open. With such an arrangement, it will be appreciated that the adjustable pilot valve will essentially be more prone to promote lifting of main stage valve body 121b, with stroke travel in direction B, main stage valve body 121a, with stroke travel in direction A. Particularly, with stroke travel in direction A, the adjustable pilot valve will essentially ensure that, with reduced side flow, a greater degree of pressure is built up so as to facilitate closing of the main stage valve body 121a. Alternatively, if control cross-section 139a would be open with control cross-section 139b being closed, the opposite behavior would essentially occur, with a greater likelihood of the lifting of main stage valve body 121a (with stroke travel in direction A) than main stage valve body 121b (with stroke travel in direction B).

Summarizing further, it is conceivable, with regard to at least one preferred embodiment of the present invention, that, with control cross-section 139a being closed, flow therethrough is at least severely inhibited while, with control cross-section 139b being closed, flow therethrough is at least severely inhibited. This inhibition of flow, in either case, is likely influenced, to a great extent, by the presence of a corresponding non-return valve 131a/b, in that the flow will initiate on that side of the corresponding non-return valve 131a/b that prevents flow therethrough.

Further, it is conceivable that, with a corresponding control cross-section 139a/b being open, flow therethrough would be significantly facilitated, allowing significant flow through flow cross-section 159 and out the corresponding non-return valve 131a/b.

Additionally, although not specifically illustrated, it is to be understood that, in accordance with at least one preferred embodiment of the present invention, with the armature 151 being in an intermediate position, both control cross-sections 139a/b will be open to at least some degree. This will likely permit a reasonable degree of throughflow in both directions A and B, resulting in softer damping characteristics in both directions.

The disclosure now turns to a description of the vibration damper disclosed in Federal Republic of Germany Patent Application No. 44 06 918 and U.S. patent application Ser. No. 08/214,615, as shown in FIGS. 1a–10. It is to be understood that, at least with regard to peripheral features that form part of the environment of the present invention, components discussed herebelow with respect to FIGS. 1a–10 may, if appropriate, be considered to be interchangeable with similar components discussed hereabove with relation to FIGS. 1 and 2.

Figure 1A:
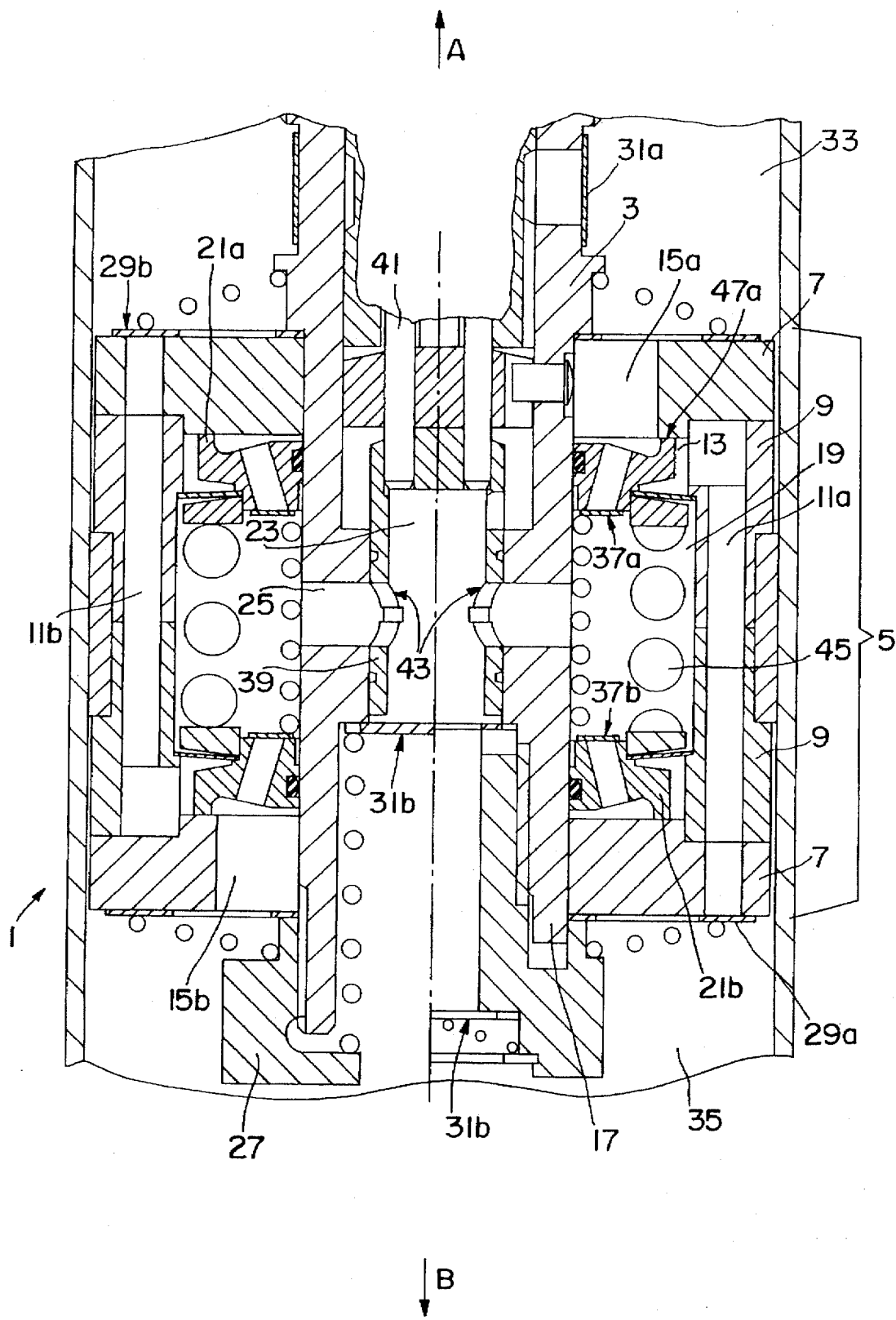
FIG. 1a shows a damping valve device with rotary valve actuator.

FIG. 1a is restricted to an illustration of a damping valve device 1 on a hollow piston rod 3. The damping valve device 1 preferably comprises, among other things, a damping valve housing 5, which in turn has, on each end, a damping valve body 7 and two damping valve intermediate bodies 9.

The two damping valve intermediate bodies 9 are preferably identical, but are preferably oriented symmetrically, so that holes form connecting passages 11a/b. Connecting passages 11a/b preferably have radial connections as the feed 13 to the influx openings 15a/b. Radially farther inside, in relation to the connecting passages, a pivot segment, or rod segment, 17 of the piston rod 3 preferably delimits, along with the damping valve intermediate body 9, a control chamber 19. Control chamber 19 is preferably axially defined on each end by main stage valve bodies 21a/b. Coaxial to the control chamber 19, there is preferably an antechamber 23 which is connected by means of radial flow connections 25 to the control chamber 19. The entire damping valve device 1 is preferably braced on the piston rod 3 by means of a nut 27.

Pivot segment, or rod segment, 17, as described herein, should generally be taken to be indicative of a hollow rod portion, generally cylindrical in shape, which is preferably generally coaxial with respect to piston rod 3. In at least one embodiment of the present invention, pivot segment 17 may essentially correspond to a terminal portion of piston rod 3.

The damping valve device 1 preferably has a series of non-return valves which control the flow conditions inside the damping valve device 1. On one hand, the exit openings of the connecting passages 11a/b preferably have non-return valves 29a, 29b. On the other hand, the non-return valves 31a/31b which block off the antechamber 23 from the adjacent work chamber 33/35 are preferably located on or in the piston rod 3. Finally, each main stage valve body 21a/b is preferably equipped with a non-return valve 37a/37b, which permits only the influx to the control chamber 19.

Inside the antechamber 23 there is a rotary valve 39, which is connected by means of control rods 41 to a torque motor (not shown). The rotary valve 39 has flow cross sections 43 which control a connection between antechamber 23 and the control chamber 19 via the radial flow connections 25.

When the damping valve device 1 moves in the direction A, the damping medium must be displaced, whereupon the damping medium preferably flows into the influx opening 15a. Inside the influx opening 15a, the medium is preferably divided into a main flow and a bypass flow. The bypass flow preferably flows through the main stage valve body 21a and the non-return valve 37a into the control chamber 19. As a function of the flow cross section 43, a pressure preferably builds up in the control chamber 19, and this pressure preferably exerts a closing force on the main stage valve body 21a. This closing force is preferably superimposed upon by the force of a closing spring 45. Preferably, if the opening force in the vicinity of the influx opening 15a is greater than the closing force of the control chamber 19, the main stage valve body 21a lifts up from a valve seat 47a, whereupon the feed 13 to the connecting passages 11a is opened. The non-return valve 31a preferably closes the work chamber 33 from the antechamber 23, so that the system pressure in the work chamber 33 cannot affect the closing force in the control chamber 19.

The discharge from the control chamber 19 preferably takes place via the non-return valve 31b which, as shown in the left half of FIG. 1a, can be next to the rotary valve 39 or, as shown in the right half of FIG. 1a, can alternatively be located at the outflow opening from the piston rod pivot segment 17.

During the stroke movement described above, the non-return valve 29b preferably closes the connecting passages 11b, so that the system pressure cannot flow into the control chamber 19.

When there is a stroke movement in the direction B, the non-return valves 29a and 31b preferably close. The damping medium preferably passes the non-return valve 37b and the closing force preferably accumulates, or increases, for the main stage valve body 21a. The bypass flow is preferably discharged via the control chamber 19. After the lifting of the main stage valve body 21b which, like the main stage valve body 21a, is centered on the pivot segment 17, the main flow preferably flows in connecting passages 11b.

Essentially, the damping force is indirectly determined by the size of the passage cross section 43, whereby for both flow directions, the discharge from the control chamber 19 can be used to change the damping force. Consequently, a change of the passage cross section 43 basically acts in the same direction, so that, essentially, for the decompression and compression direction, there are identical changes toward harder or softer damping force settings. Thus the passage cross section 43, in connection with the main valve body, essentially performs a pressure relief function, since the passage cross section is essentially never altogether closed, and the main valve body 21 can lift up in the event of pressure peaks.

With regard to the actuator, it should also be noted that the rotary valve 39 is preferably designed in a pressure-equalized manner to minimize the energy expenditure. The flow cross section 43, which simultaneously represents the advanced opening cross section, is preferably always partly open. The result is a pressure limiting action, since the discharge from the control chamber 19 can essentially never be blocked. Utilizing the flow cross section 43 as the advanced opening cross section can preferably advantageously change the characteristic of the damping valve device 1, since the flow cross section 43 is preferably opened to the maximum for the "soft" damping force setting. Simultaneously, the advanced opening cross section is particularly large, so that the shock absorber has a very soft and comfortable response.

The radial arrangement of the control chamber 19 in relation to the antechamber 23 in connection with the connecting passages 11a and 11b essentially results in a very short damping valve device 1, which also includes short flow paths. This takes into account the fact that the currents with the lowest volumes are placed centrally, and the main flow radially to the outside on a large arc, to achieve the greatest possible flow. The uniformity of the parts, e.g. of the main stage valve bodies 21a/21b or of the damping valve bodies 7 and 9, significantly reduces the manufacturing expense.

Figure 1B:
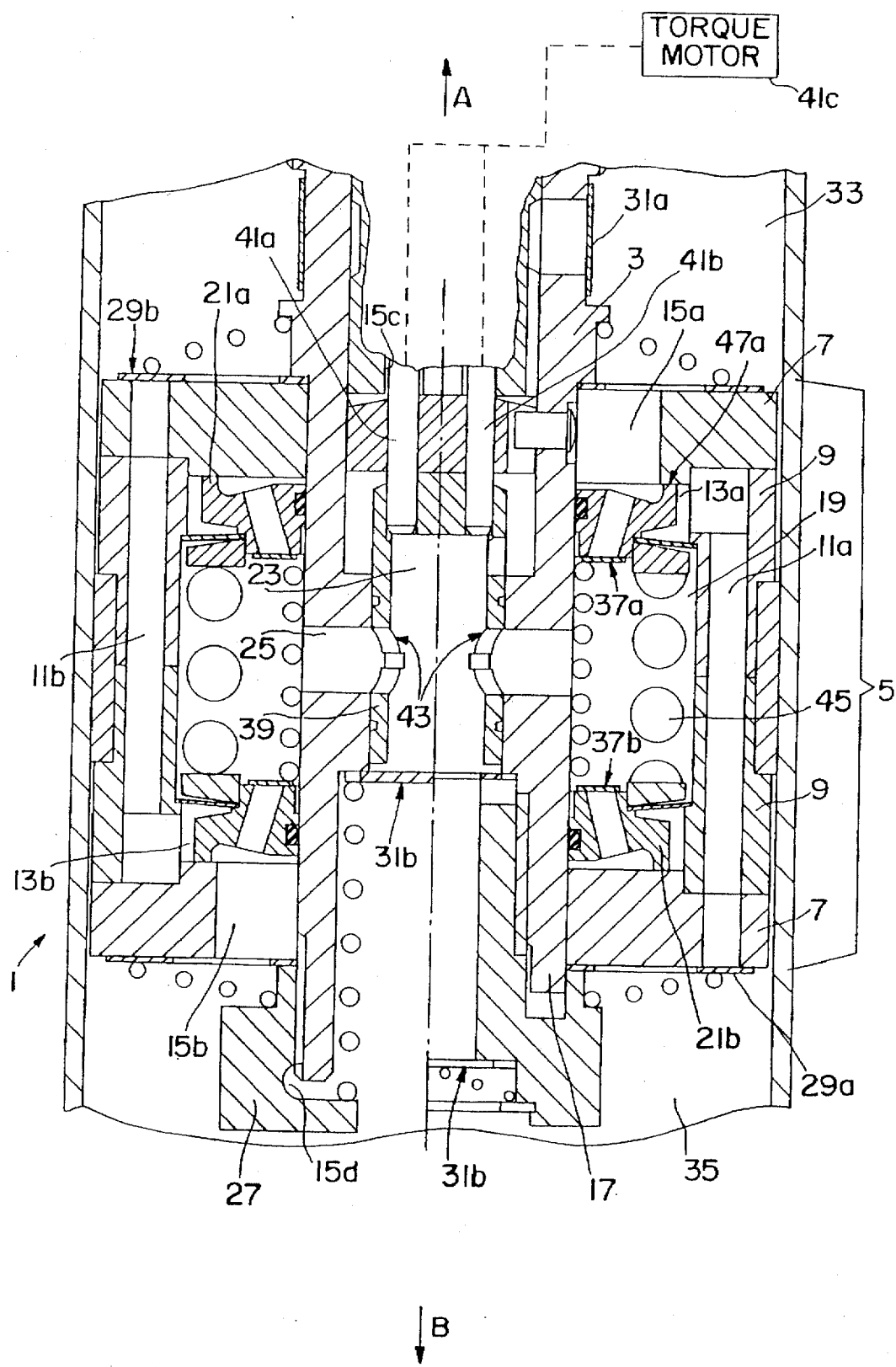
FIG. 1b is essentially the same view as FIG. 1a, but more detailed.

FIG. 1b is substantially the same view as FIG. 1a, but more detailed. As shown in FIG. 1 b, according to one embodiment of the present invention, flow into chamber 15a may take place via passage 15c and flow into chamber 15b may take place via passage 15d. Of course, other arrangements of passages for directing flow into chambers 15a and 15b may be utilized in accordance with the embodiments of the present invention.

Also, as shown in FIG. 1b, according to a preferred embodiment of the present invention, a torque motor 41c may preferably be provided to displace control rods 41a and 41b in a generally circular path about the longitudinal axis of piston rod 3 to transfer a rotational force to rotary valve 39 to control the cross-section of openings 43. Torque motor 41c, as such, will preferably be connected to control rods 41a and 41b in such a manner as to best facilitate such a transfer of rotational force.

Figure 1C:
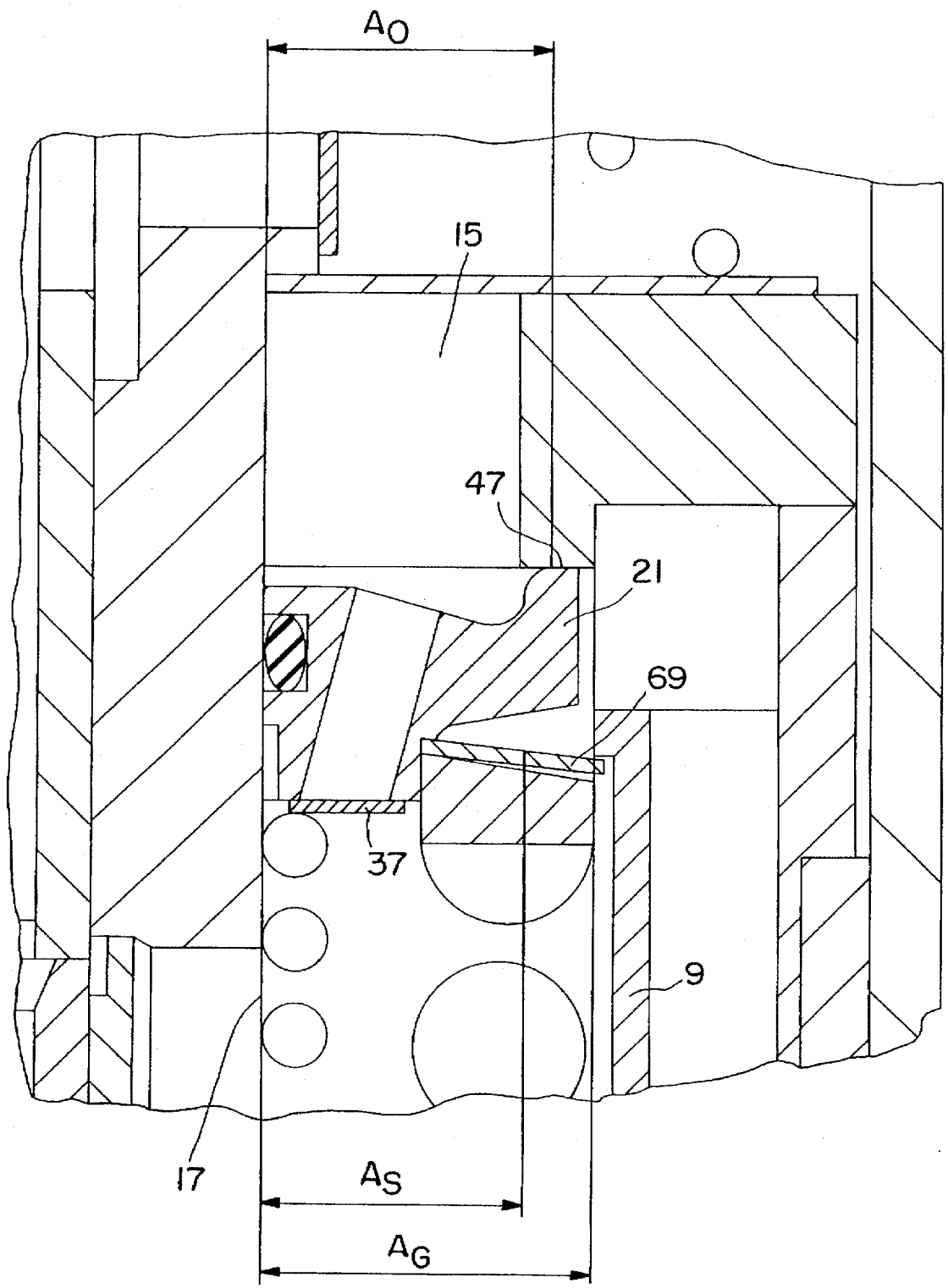
FIG. 1c is a detail of the main valve body area.

FIG. 1c shows a greatly-enlarged detail of FIG. 1a in the vicinity of the main stage valve body 21. The effect of the main stage valve body 21 in connection with an always partly open advanced opening cross section 43 essentially results from an area ratio between the control-chamber-side and the inflow-opening-side hydraulic active areas (Ao/As). The valve-opening surface area Ao essentially results from the circular ring of the main stage valve body 21, whereby the inside diameter of the valve seat 47 represents the outside diameter of the circular ring surface Ao. The hydraulically pressurized surface Ag is essentially formed by the control-chamber-side surface of the main stage valve body 21 and the spring plate 69. The spring plate 69 is essentially supported on the housing 9 and on the main stage valve body 21. Consequently, essentially one-half of the hydraulic closing force acts on the housing 9 and the other half on the main stage valve body 21a. The valve-closing hydraulically pressurized active area thus essentially consists of the sum of the areas of the control chamber side main stage valve body and one-half of the effective surface area of the spring plate. For the pressure control effect, it is highly desirable that the valve-opening surfaces be larger than the valve-closing surfaces. Consequently, when there is equal pressure in the control chamber 19 and in a shrinking work chamber, the hydraulic opening forces are essentially greater than the valve-closing forces. Thus, for the design of the closing springs, above a defined operating pressure in the shock absorber, the hydraulic pressure which acts on the differential area between the valve-opening and the valve-closing surfaces is preferably essentially greater than the force of the closing spring.

Figure 2A:
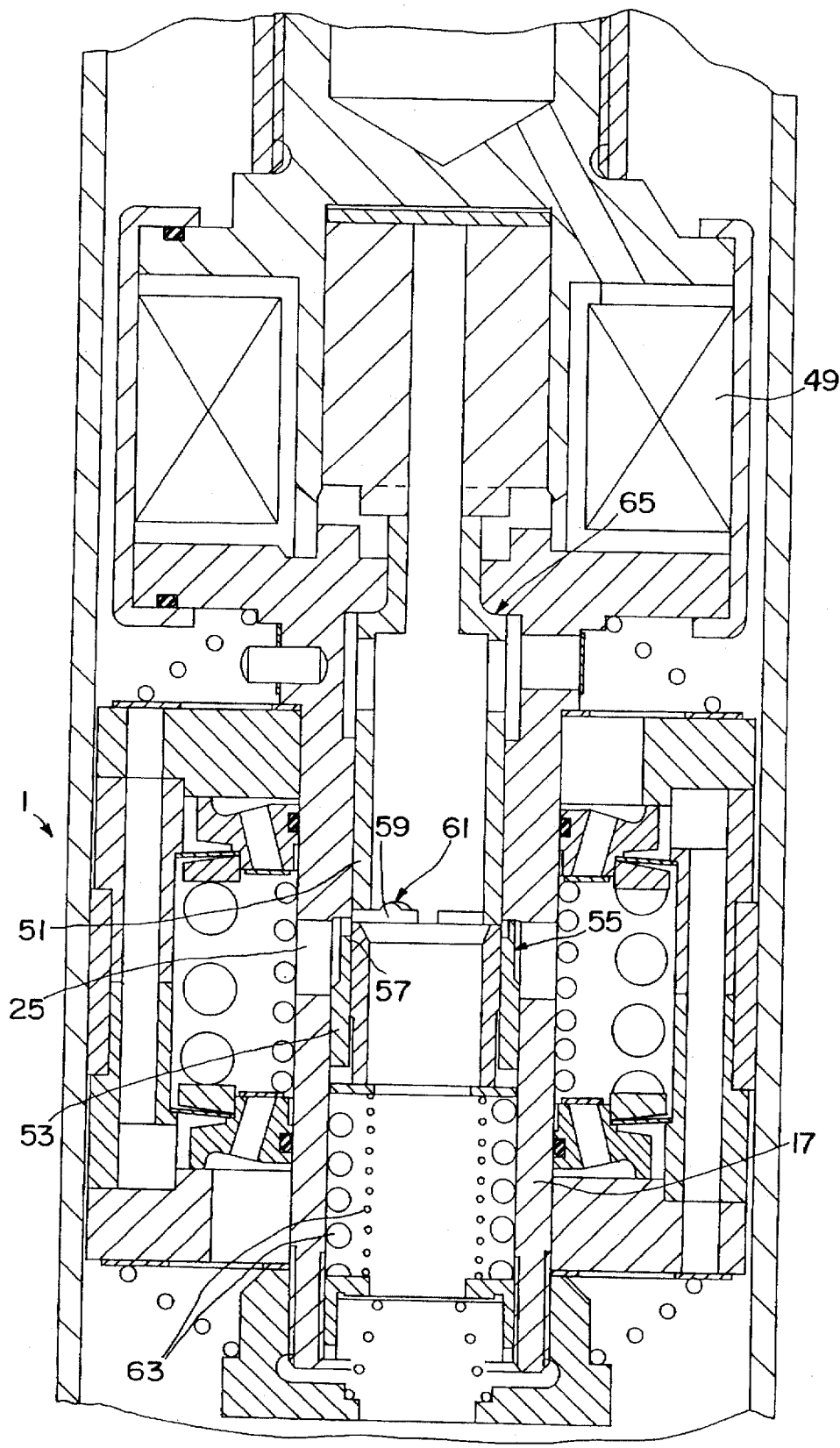
FIG. 2a shows a damping valve device with ring magnet and armature.

FIG. 2a illustrates essentially the same structure as FIGS. 1a and 1c. In the embodiment of FIG. 2a, however, there are differences in the actuator, which, in FIG. 2a, preferably consists of a ring magnet 49 in connection with an axially movable armature 51, the armature 59 being located so that it can slide inside the pivot segment 17. The radial flow connection 25 preferably has a sleeve 53 with a collecting extension 55, which in turn preferably has notches 57, which together with holes, or recesses, 59 form the advanced opening cross section. The collecting extension 55 preferably leads the damping medium out of the control chamber to the advanced opening cross section. For precise control, the recesses 59 preferably have additional moldings 61 which can be configured as necessary, to realize a desired cross section area, as a function of the stroke length of the armature 51.

Thus, in accordance with a preferred embodiment of the present invention, as shown in FIG. 2a, the advanced opening cross section can preferably be formed by notches 57 in conjunction with recesses 59. As shown, notches 57 and recesses 59 are preferably configured such that, upon axial displacement of armature 51, the notches 57 and recesses 59 will either interface to a given degree so as to produce a given advanced opening cross section, or be disposed separately from one another so as to essentially close the passage formed therebetween.

As a fail-safe device, in the event that power to the ring magnet 49 is lost, there can preferably be a pair of coil springs 63 on the outlet opening of the pivot segment 17 braced against the armature 51. The springs 63 preferably have a slightly different length, and preferably differ significantly in terms of their spring constants, whereby the longer spring 63 preferably has the lower spring constant. When the power to the magnetic coil 49 fails, the longer spring is preferably configured to push the armature 51 against a contact surface 65. In this position, the advanced opening cross section is preferably set to an intermediate value, so that a medium damping force characteristic is realized.

Figure 3:
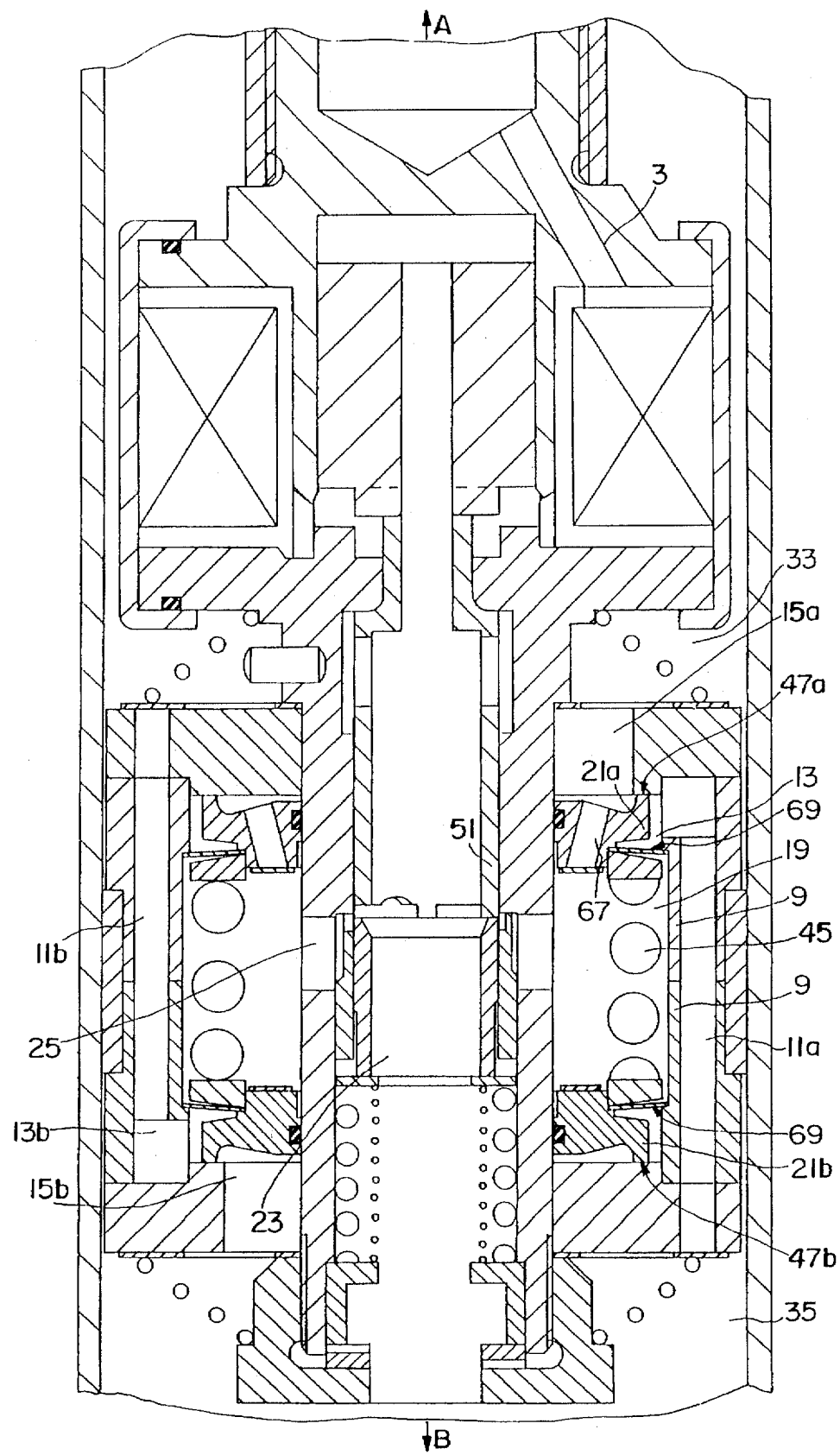
FIG. 3 shows a damping valve device with damping force adjustments in opposite directions.

FIG. 3 illustrates essentially the same structure as FIG. 2a, but there are functional differences which are described below.

One of several differences between the structure illustrated in FIG. 3 and the structure illustrated in FIG. 2a is that the control chamber 19 in FIG. 3 essentially has no non-return valves (as indicated at 37a and 37b in FIG. 1a). Preferably, in accordance with the embodiment illustrated in FIG. 3, only the main stage valve body 21a has holes 67 for the bypass flow and the main stage valve body 21b is preferably designed as a solid body. The antechamber 23 also preferably has no non-return valves (as indicated at 31a and 31b in FIG. 1a), whereby there is preferably no connection between the antechamber 23 and the work chamber 33, and the connection from the antechamber 23 to the work chamber 35 preferably remains straight.

When the piston rod 3 executes a stroke in direction A, the medium preferably flows into the inflow opening 15a, whereby the bypass flow preferably continues through the holes 67 into the control chamber 19. As a function of the discharge via the flow cross section, that is, the advanced opening cross section between the armature 51 and the sleeve 53, a closing force is preferably exerted on the main stage valve body 21a, on which is superimposed the force of the closing spring 45, since the control-chamber-side surfaces of the main stage valve body 21a are essentially smaller than the valve-opening surfaces. If the pressure in the work chamber 33 increases further, the main stage valve body 21a preferably lifts up from its valve seat 47a. The radial inflow 13 to the connecting passages 11a is preferably thence opened. In the decompression direction, there is thus a damping force control by means of the damping medium discharge from the control chamber 19. When the damping valve 1 receives an inflow from direction A, the damping medium preferably presses the main stage valve body 21b against its valve seat. The main stage valve bodies 21a/b essentially cannot be overflowed, since spring plates 69 close the gap between the inside diameter of the damping valve intermediate body 9 and the main stage valve bodies 21a/b.

When the inflow is in the reverse direction, i.e. from direction B, the damping medium preferably simultaneously flows into the inflow opening 15b and into the antechamber 23. As a function of the advanced opening cross section, the damping medium can preferably flow via the radial flow connections 25 into the control chamber 19 with a more or less large pressure loss. When there is a small advanced opening cross section, there is preferably only a small pressure force of the damping medium in the control chamber, which opposes the system pressure applied in the inflow opening 15b.

Consequently, the main stage valve body 21b preferably lifts up from its valve seat 47b and releases the inflow 13b to the connecting passages 11b. The damping force characteristic is preferably set for the direction B from the inflow into the control chamber 19.

If we start with a stationary status of the armature 51, in which the advanced opening cross section is relatively large, then there is essentially a soft damping force characteristic in stroke direction A and a hard damping force characteristic in stroke direction B. When there is a small advanced opening cross section, the damping forces are essentially on an exactly opposite level for both of the flow directions. If, and to the extent that the damping force setting for the one stroke direction is adjusted to a more extreme position, the damping force setting for the other stroke direction is also essentially adjusted in the opposite direction. The damping valve device 1 in this embodiment is particularly attractive, if the intention is to achieve a levelling of the vehicle, or to realize a "skyhook" shock absorber, to reduce the switching rates of the damping valve device 1.

Figure 4:
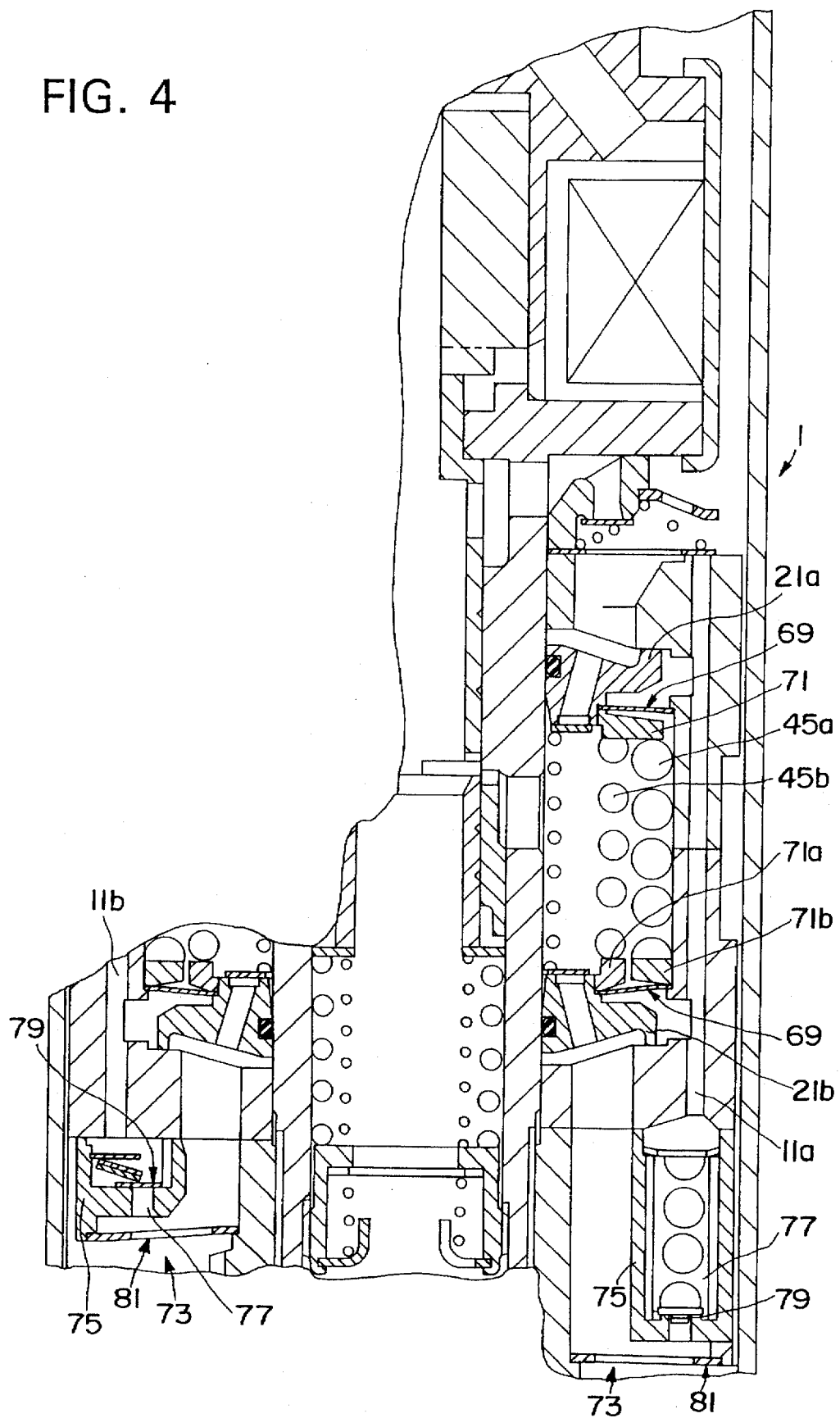
FIG. 4 shows a damping valve device with pressure control valves.

FIG. 4 illustrates essentially the same functional design as FIG. 2a. One of several differences is that there are preferably two closing springs 45a/45b for the two main stage valve bodies 21a/21b. The main stage valve body 21a preferably has, for both springs, a common support body 71, which is preferably engaged with the inside diameter of the spring plate 69. The main stage valve body 21b also preferably has a spring plate 69, but two support bodies 71a/71b are preferably supported on it. For the main stage valve body 21a, that means that the sum of the spring forces of the closing springs 45a/45b is essentially effective, but for the main stage valve body 21b only the spring 45b is essentially effective, since the spring 45a is supported by the outside diameter area of the spring plate 9 (see FIG. 1a) on the damping valve housing. This measure essentially increases a basic, directionally-dependent damping force setting, without increasing the axial size of the control chamber 19.

The damping valve device 1 also preferably has a pressure control valve 73, which preferably consists of a non-return valve body 75 into which a connection cross section 77 has been worked, and which is preferably covered by a spring-loaded closing body 79. If the pressure on the closing body 79 exceeds a level which is greater than the spring load, the closing body 79 preferably lifts up and opens the path into the connecting passages 11a and 11b. In the opposite flow direction, the pressure control valve 73 preferably opens with practically no loss of pressure against the force of a guide spring 81.

Figure 5:
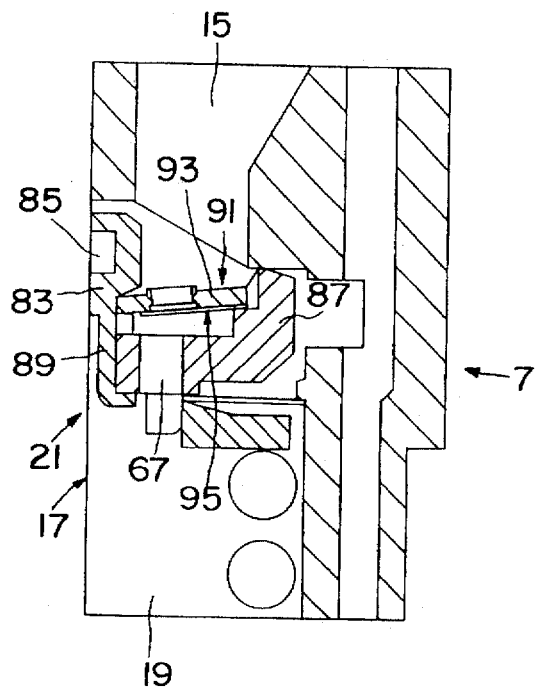
FIG. 5 shows a damping valve device with pressure control valves in the main stage valve body.

FIG. 5 is restricted to an illustration of a detail of the damping valve device 1 in the vicinity of the damping valve body 7, in particular on a main stage valve body 21. The main stage valve body 21 can preferably be designed in two parts. It comprises, among other things, a main stage valve body guide 83 with a seal 85, which preferably acts against the pivot segment 17. The second part represents the valve body 87 proper, which is preferably centered on a guide web 89. Holes 67 are preferably made in the valve body 87, and are preferably covered in the direction of the inflow opening 15 by a combined non-return and pressure control valve 91, consisting of two valve disc bodies braced against one another. The pressure control valve 91 is preferably formed by a plate spring 93 which is braced between the main stage valve body guide 83 and the valve body 87. The spring plate 93 preferably has holes which are covered by a highly-elastic disc 95, which preferably lifts up in the inflow direction of the control chamber 19 from the spring plate 93. When the pressure conditions are in the conventional range of operation of the shock absorber, the non-return valve 91 preferably works as described above with reference to FIGS. 1a and 2a. The medium preferably flows into the inflow opening 15, whereby the bypass flow preferably continues through the holes in the spring plate 93 and the elastic disc 95 lifts up, so that the damping medium can flow into the control chamber 19. When the inflow is in the reverse direction and there is an overpressure in the control chamber 19, the outside diameter of the spring plate 93 preferably lifts up from the valve body 87, so that the pressure in the control chamber 19 can drop quickly. The advantage of a pressure control valve in the bypass flow is that only very small volume flows need to be used to achieve protection against overpressure.

Figure 5A:
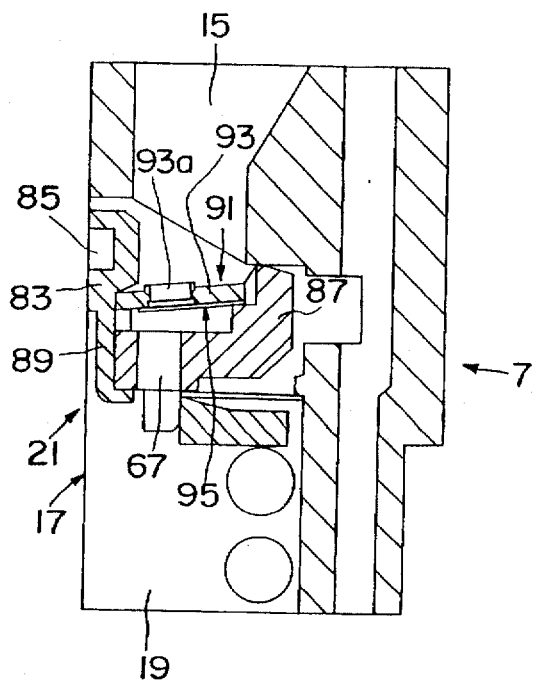
FIG. 5a is essentially the same view as FIG. 5, but more detailed.

FIG. 5a is substantially the same view as FIG. 5, but more detailed. As shown in FIG. 5a, according to a preferred embodiment of the present invention, disc 93 is preferably provided with a passage or hole 93a to permit flow therethrough.

Figure 6:
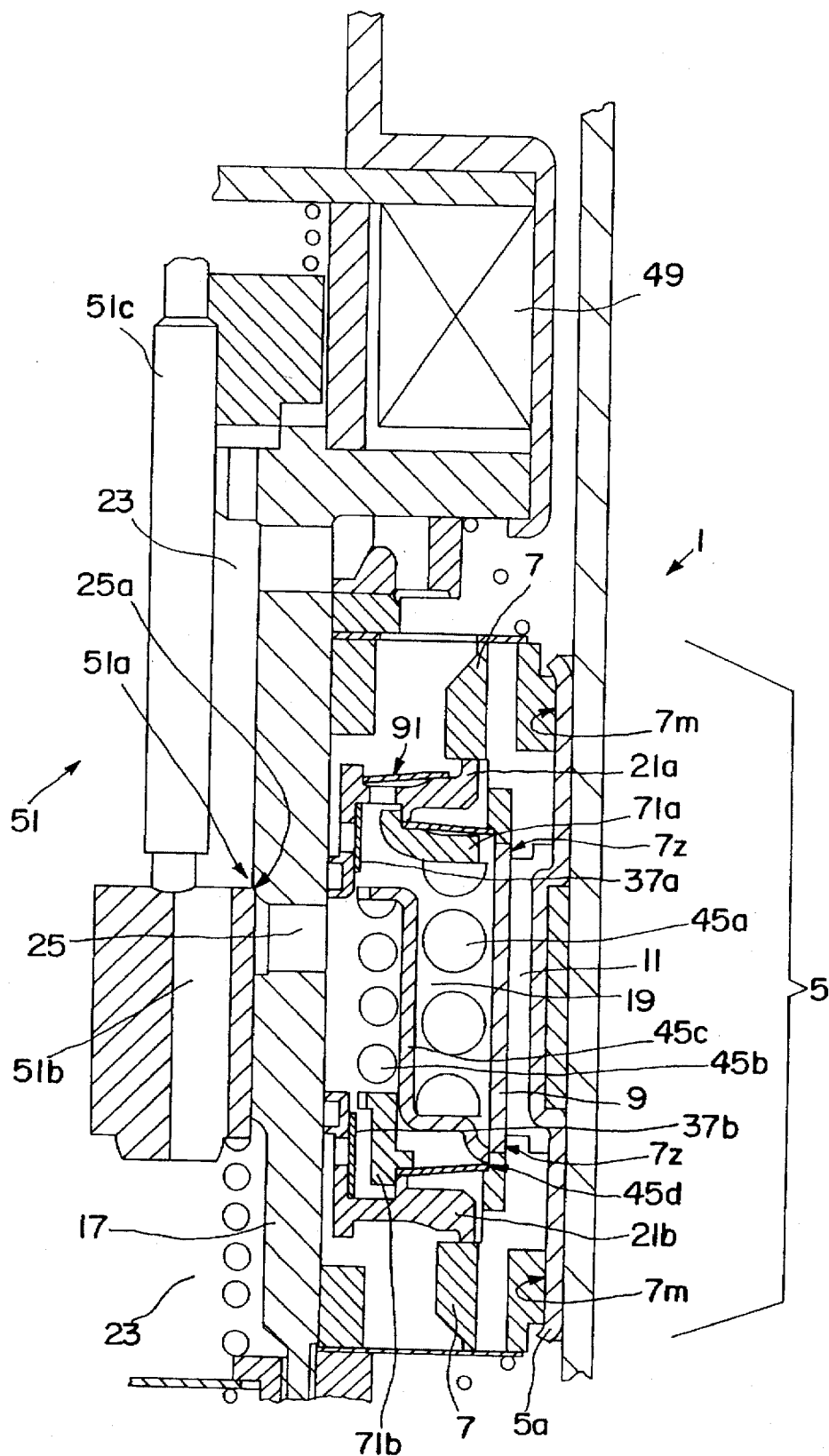
FIG. 6 shows a damping valve device with a seat valve.

FIG. 6 illustrates a damping valve device 1 which essentially comprises a combination of features found in the embodiments represented by FIGS. 2a, 4 and 5, so that the following description relates essentially only to the differences in the designs. One general difference is that, according to the embodiment illustrated in FIG. 6, an armature 51 preferably forms a seat valve 51a together with the pivot segment 17. The pivot segment 17, in the vicinity of the radial flow connection 25, preferably has a slanted surface 25a, so that a continuous opening action of the seat valve 51a is guaranteed. The armature 51 preferably has a connection hole 51b, so that the two parts of the antechamber 23 are preferably connected and the armature 51 is pressure-equalized. Inside the armature 51, there is also preferably a connecting rod 51c, which, as shown, preferably has a crown on at least one end, so that an angle offset equalization becomes possible inside the damping valve device.

The non-return valves 37a/b also preferably differ from the valves described further above. For example, the bypass flow preferably flows radially into the control chamber 19, so that the non-return valves 37a/b must essentially execute a radial motion. Therefore, for realization of non-return valves 37a/b, ring-shaped elastic closing bodies are preferably inserted into the valve 1, which ring bodies, as a function of the expected pressure level, are preferably made of plastic, rubber or, for particularly high pressures, of a slotted metal ring. These embodiments of the check valves essentially make possible a non-linear opening action in the inflow direction, which can be very advantageous for the tuning of the shock absorber. The number of parts, in particular the number of moving parts, is also essentially reduced. Utilizing the advantages described above in relation to FIG. 5 regarding the use of a pressure control valve, the pressure control valve 91 is preferably separated from the non-return valve 37a. The expense of the pressure control valve is thereby essentially reduced to one or more spring plates, which are braced on the main stage valve body.

An additional significant difference from the variants described above, in particular with reference to FIG. 4, is that the two closing springs 45a, 45b, on account of their particular orientation, essentially do not involve any dependencies on the spring forces for the main stage valve bodies 21a, 21b. A spring guide sleeve 45c, which is preferably stationary in relation to the damping valve intermediate body 9, is the support mechanism for the two springs, so that the two spring forces do not affect one another. In this presentation, the prestress force of the closing spring 45a is preferably several times greater than that of the closing spring 45b, by a factor of approximately 4, on the basis of experience, so that the closing spring 45a preferably defines the position of the spring guide sleeve 45c on a shoulder 45d of the damping valve housing 5. Alternatively, the spring guide sleeve 45c can also preferably be braced between a damping valve head body 7 and the damping valve intermediate body 9. The closing springs 45a/b, by means of support bodies 71a/b, are preferably engaged with the main stage valve bodies 21a/b, whereby in particular the support body 71b preferably performs a guide function for the non-return valve 37b by means of its ring contour.

In the damping valve device 1, between the facing sides of the damping valve head bodies 7 there is preferably a rather large number of parts arranged in a row which, on account of the differences in their tolerances, have a predominant effect on the prestress lengths of the closing springs 45a/b. That can result in significant damping force fluctuations, but they can be reduced by checking the function of the damping device 1 during assembly, and reducing the distance between the two damping valve head bodies 7 until the prestress length of the springs 45a/b is set. For this purpose, at least one of the damping valve end bodies 7 is displaced axially relative to a jacket tube 5a toward the damping valve intermediate body 9, so that the latter experiences a reduction of its axial length. For that purpose, the damping valve intermediate body 9 is preferably made of a plastically deformable material, e.g. aluminum. Once the correct adjustment has been made, the jacket tube 5a is preferably connected to the damping valve head body 7, e.g. by means of hammering the edge.

The damping valve intermediate body 9 is preferably guided by centerings 7z of the damping valve head body 7. The jacket tube 5a is also radially supported on the circumferential surfaces 7m, so that the toroidal space 11 between the jacket tube 5 and the damping valve intermediate body 9 is available as a connection passage 11 for the main flow.

FIGS. 7a to 7d show a damping valve device 1 which has two control chambers 19a/19b, which are controlled by a common armature 51. The control chambers 19a/19b inside the damping valve housing 5 are separated by a hydraulically tight partitions 97. Inside the armature, there are recesses 59a/b, which in turn are axially enlarged by moldings 61a/b. The rest of the design is essentially the same as in FIG. 2a. The armature 51, together with the sleeve 53, forms advanced opening cross sections, which are effective between the antechamber 23 and the radial flow cross sections 25. The sleeve 53 has control apertures 99a/b and notches 57 at some axial distance from one another, which correspond to the control chambers 19a and 19b respectively.

Figure 7A:
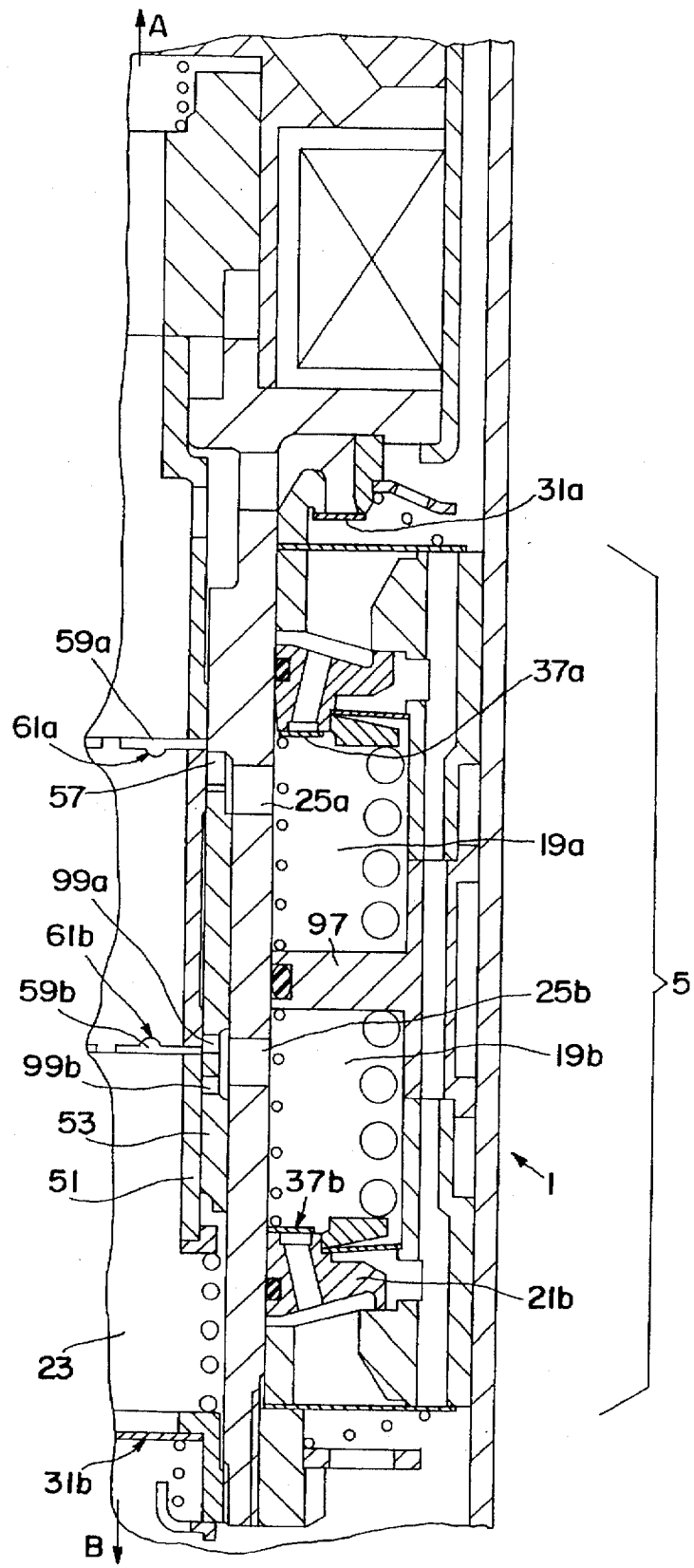
FIGS. 7a–d show a continuously adjustable damping valve device with two control chambers.

In FIG. 7a, the armature 51 assumes a position in relation to the sleeve 53 in which the notch 57 overlaps only with the molding 61a, so that there is a small advanced opening cross section. The molding 61b with the recess 59b in its entire cross section is located inside the holes 99a. This position, for a stroke movement of the damping valve device 1 in direction A, means that the damping medium flows in a controlled manner out of the control chamber 19a and the tendency is toward a hard damping force characteristic. The damping medium can of course flow in through the recesses 59b and moldings 61b via the control apertures 99a into the control chamber 19a, but a non-return valve 37b blocks the outflow, so that the main stage valve body 21b closes the control chamber 19b. The bypass flow from the control chamber 19a can be made to flow out by means of the non-return valve 31b, via the antechamber 23.

In the stroke direction B of the damping valve device 1, the bypass flow flows through the control chamber 19b and the control apertures 99a into the common cross section of the recesses 59b and moldings 61b into the antechamber 23. A short circuit via the control chamber 19a is prevented by the non-return valve 37a. The outflow from the antechamber 23 is controlled by the non-return valve 31a. This is a soft basic setting, but one which becomes progressively harder, the greater the overlap between the recess 59a and the notch 57.

Figure 7B:
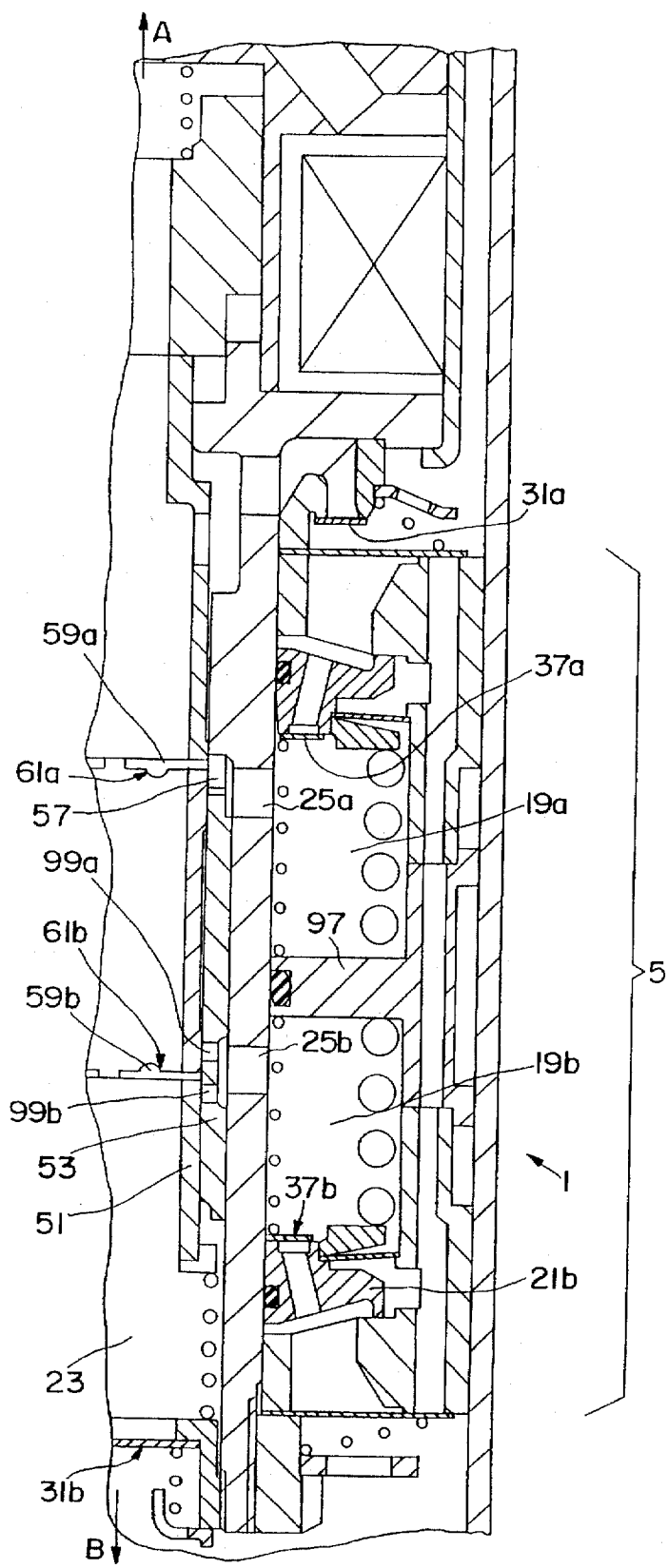

FIG. 7b shows the extreme setting/position between the recess 59a or molding 61a and the notch 57, as well as the recess 59b and molding 61b, with the control apertures 99a. In this armature position, the softest characteristic is in stroke direction A, and the hardest characteristic in decompression direction B.

Figure 7C:
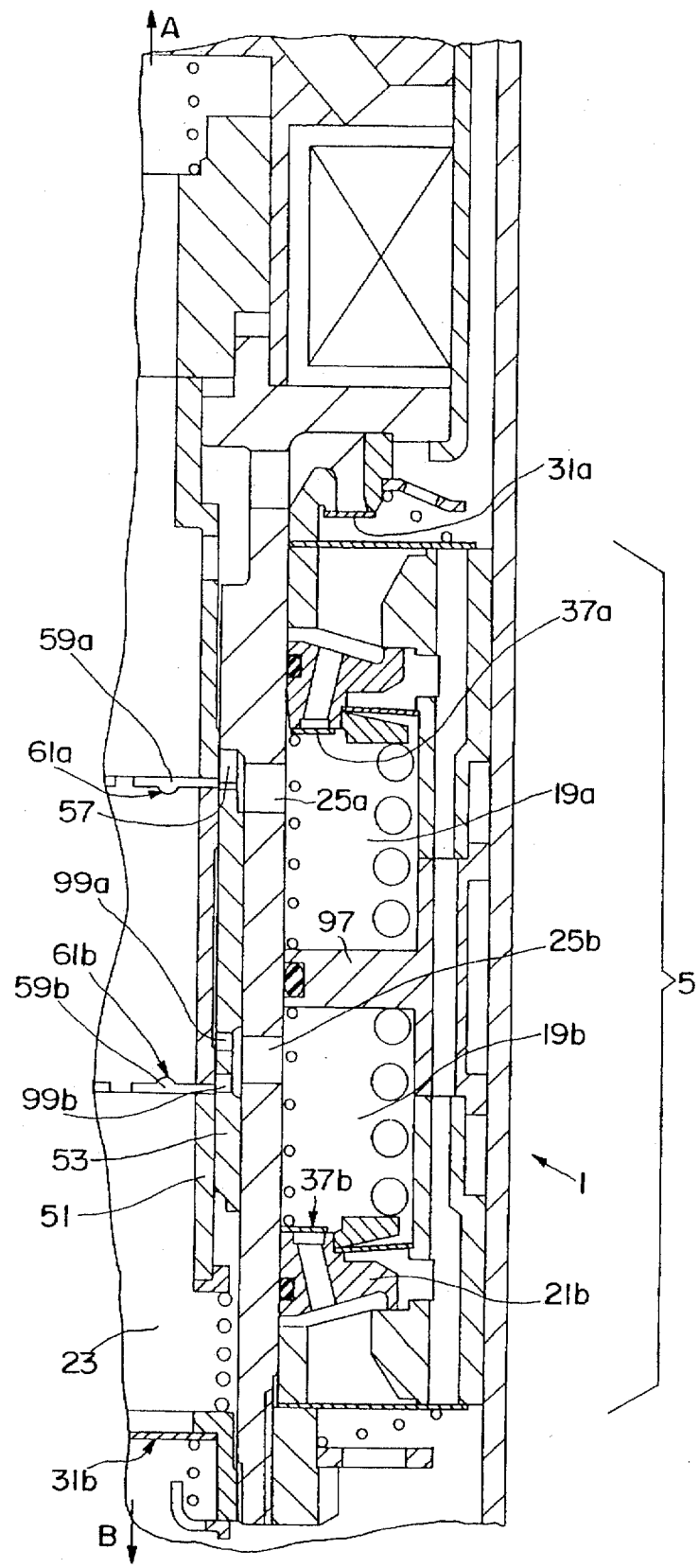

In FIG. 7c, the outflow from the control chamber 19b always occurs via the control apertures 99b. The size of the overlap between the notches 57 and the recesses 51a and 51b determines the damping force. Likewise, the damping force is set by means of the control apertures 99b with the recesses 59b and the moldings 61b. The overlaps or advanced opening cross sections are changed in the same direction when the armature moves. For the damping force setting, that means that when there is an enlargement of the advanced openings, the damping force setting in the decompression and in the compression direction is set uniformly toward a softer damping force. For an adjustment tending toward a harder damping force characteristic, both advanced openings are reduced in size.

Two basic settings of the damping valve device 1 are realized by means of the two control apertures 99a/b or groups of apertures, if there are a number of apertures, which means that a continuous adjustment of the damping force between two extreme settings, "hard" and "soft", is possible for each stroke direction.

Figure 7D:
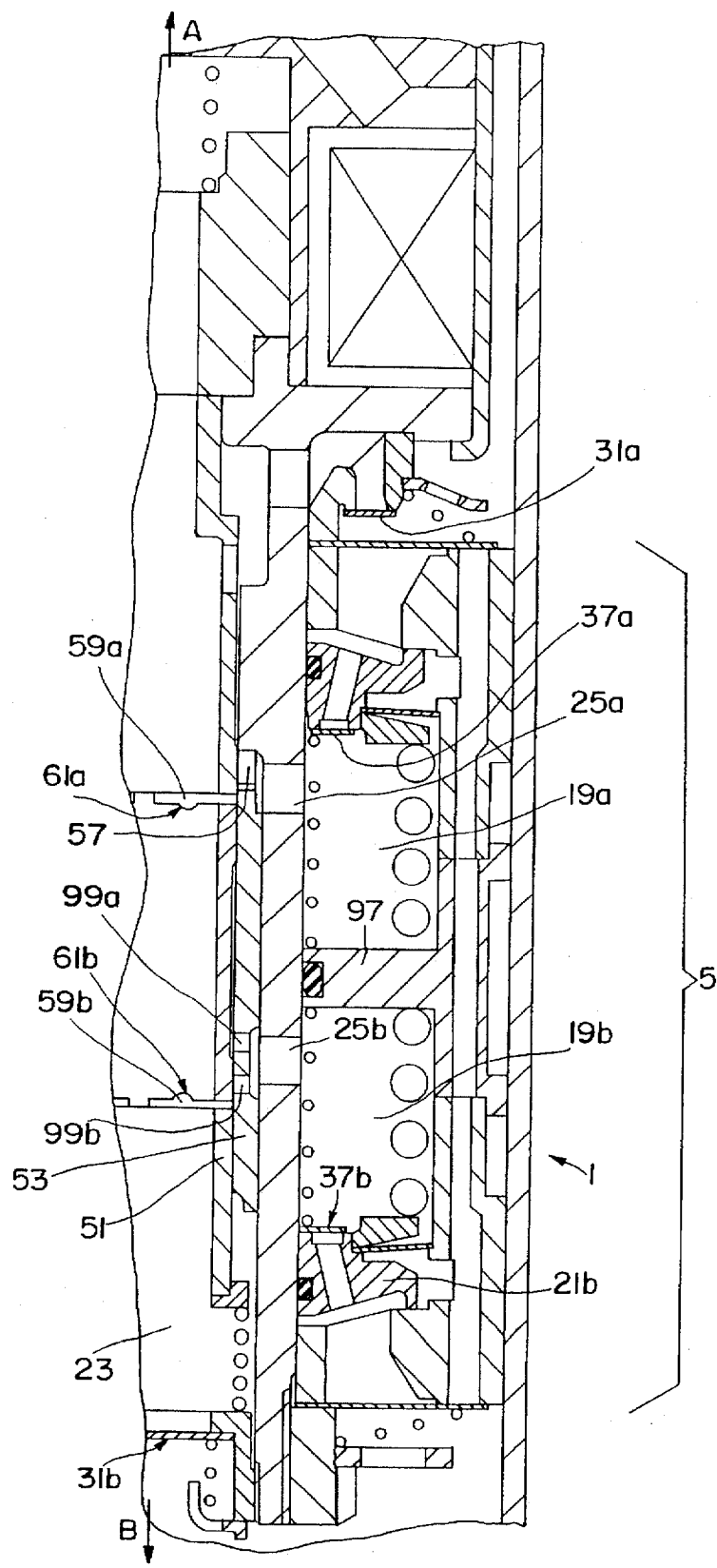

FIG. 7d shows the armature in the setting which achieves the hardest setting for both stroke directions.

FIGS. 8a to 8d show an armature 51 which can be switched by discrete intervals, and which, in this configuration, makes possible two basic settings in connection with two damping force characteristics each. The damping force is set, essentially as in the preceding figures, by the overlap between the armature 51 and the sleeve 53. The difference with respect to FIGS. 7a to 7d is that the armature 51, the recesses 59a and 59b, and the moldings 61a/b all have one or more constant throttles 101a/b. In the sleeve 53, there is an extension of the radial flow connections 25a/b for each control chamber 19a/b.

Figure 8A:
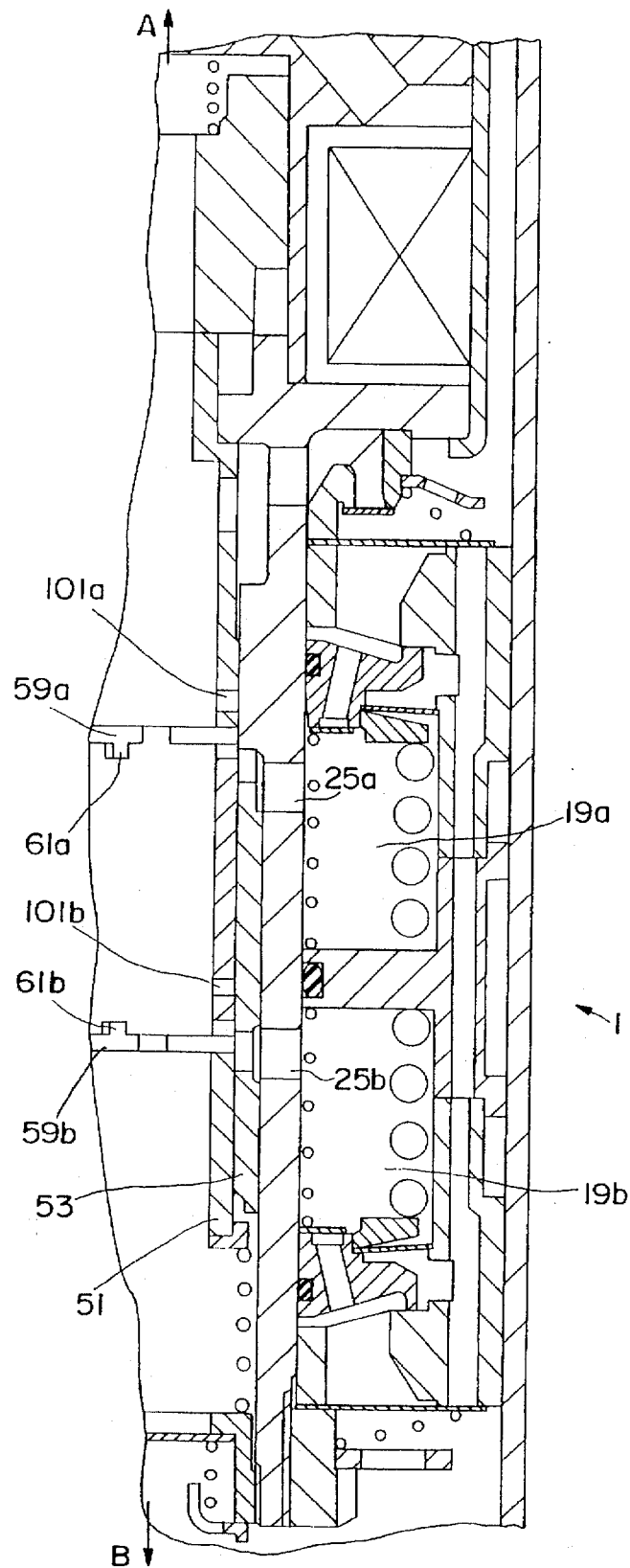
FIGS. 8a–d show a stepped damping valve device with two control chambers.

The general operation of the damping valve apparatus shown in FIGS. 8a to 8d is the same as in FIGS. 7a to 7d. The most important difference is the possibility of discrete settings for the adjustment of the damping valve device 1. In FIG. 8a, the hardest damping force setting is for the stroke movement in direction A, since the advanced opening cross section for the control chamber 19a is determined solely by the moldings 61a. For the stroke movement in the opposite direction, the maximum advanced opening, formed by the recess 59, essentially recess 59b, is available for the control chamber 19b, which thereby produces the soft damping force setting.

Figure 8B:
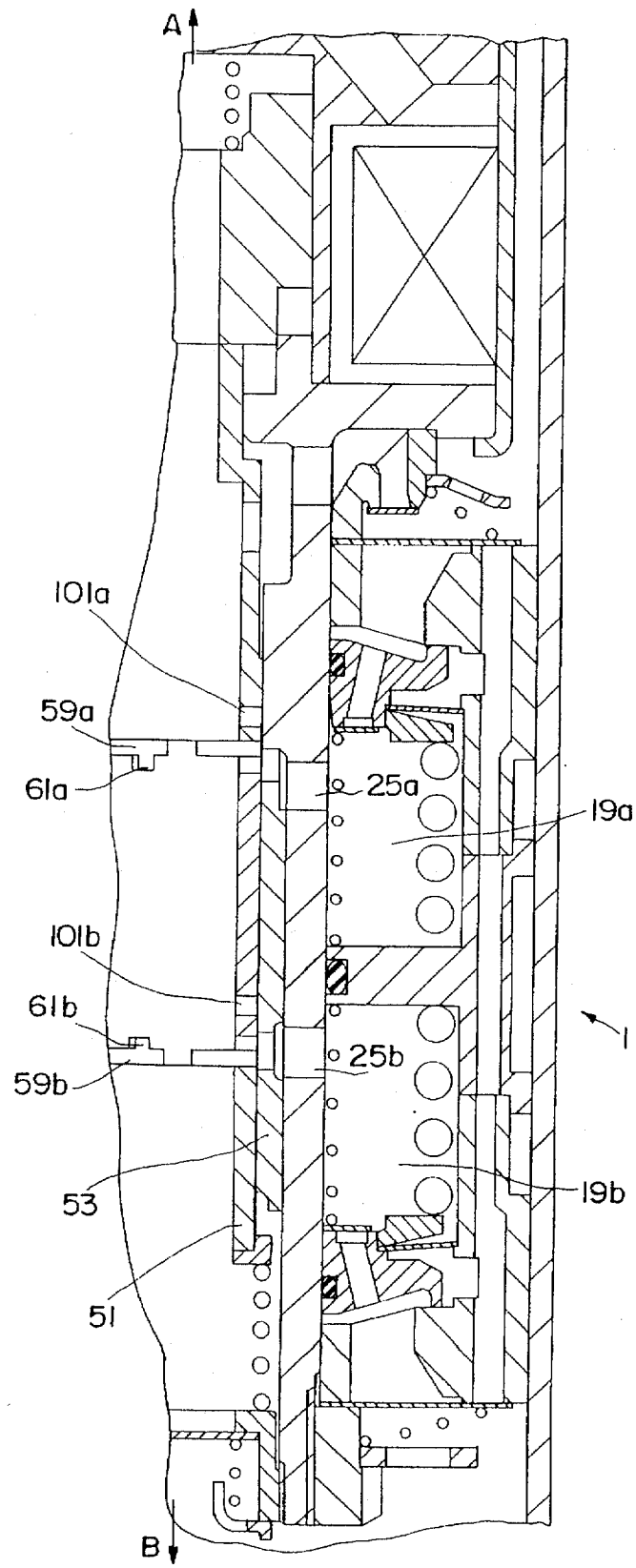

FIG. 8b shows an armature position which provides the maximum advanced opening for both stroke directions, so that the softest dumping force is also set for both stroke directions.

Figure 8C:
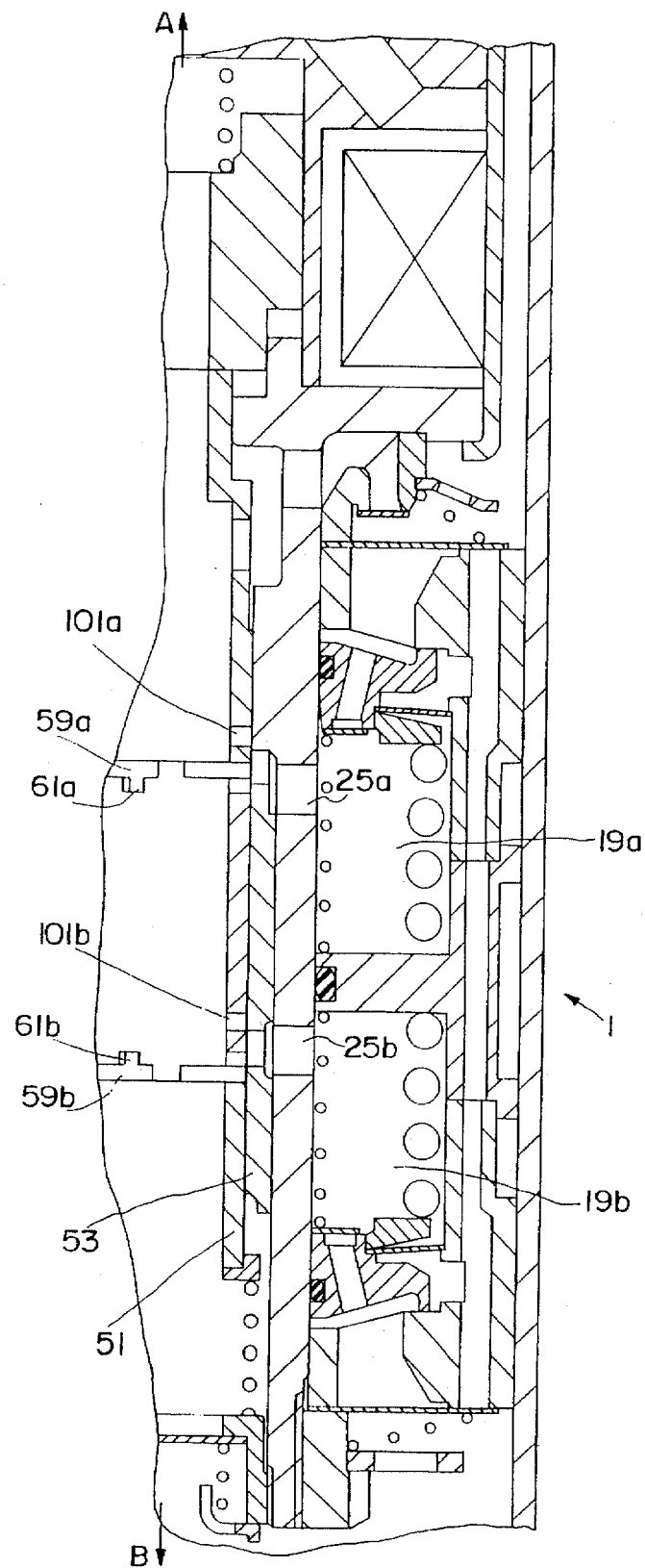
Figure 8D:
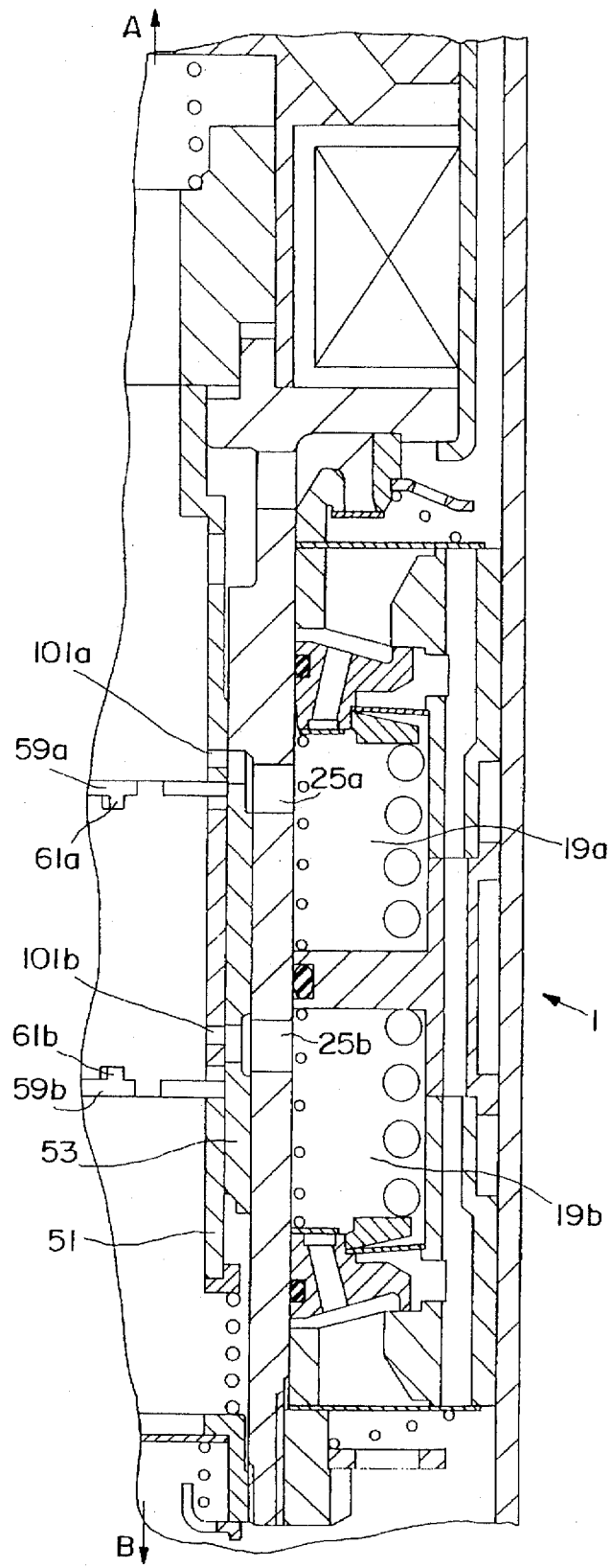

In FIG. 8c, the recess 59a overlaps the extension of the radial flow connection 25a, while for the radial flow connection 25b, only the moldings 61 can be used as the closure or advanced opening. Consequently, the damping valve device produces the softest damping force setting in stroke direction A and the hardest damping force setting in stroke direction B. Likewise, in FIG. 8d, the hardest damping force setting results for both flow directions, since only the Constant throttles 101a and 101b determine the advanced opening cross section.

The position of the armature 51 for the damping valve setting of both stroke directions to "hard" is preferably placed so that the armature 51 travels the greatest distance and thus produces the greatest current for the ring magnet. This armature position is required only very infrequently in the day-to-day operation of a vehicle. As a result of this efficient arrangement of the control positions, it is possible to exert an indirectly positive effect on the power supply of the ring magnet.

The advantage of the stepped damping valve design compared to the continuously adjustable design is that the constant throttles 101a and 101b increase the allowable tolerances inside the damping valve device. It is generally not relevant whether the constant throttles assume their control points within a range of several tenths of a millimeter inside the continuation of the radial flow paths 25. The advanced opening is formed only by the cross section of the constant throttles.

The illustrations in FIGS. 7 and 8 can naturally be expanded to include the pressure control valves illustrated in FIGS. 4 and 5. Likewise, the use of the damping valve device 1 is not restricted only to a piston valve, but it can also be used in a bypass on a shock absorber.

Figure 9:
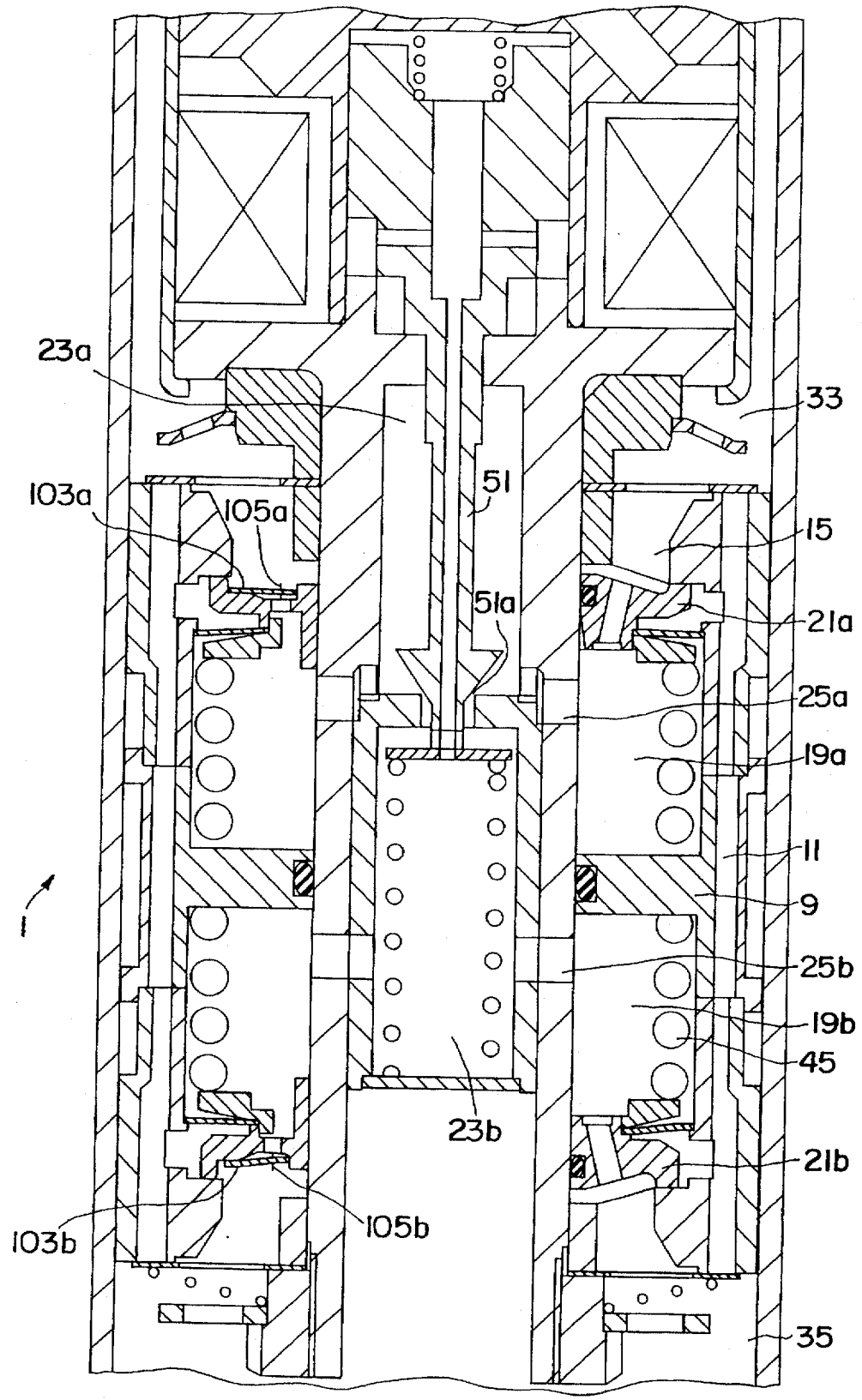
FIGS. 9 and 10 show a damping valve device with bi-directional flow.

FIG. 9 shows a damping valve device 1 which, like FIGS. 7 and 8, also has a control chamber which is divided into two control chambers 19a/19b. The two control chambers 19a/19b are connected to one another by means of the antechambers 23a/23b and the pilot stage valve, which is formed by the armature 51.

In FIG. 9, the function proceeds in the decompression direction, so that the volume flow from the work chamber 33 is divided into the bypass flow and the main flow, whereby the bypass flow flows through the main stage valve body 21a into the control chamber 19a, and a pressure builds up there which is exerted on the main stage valve body 21a. The bypass flow continues through the radial flow connection 25a to the pilot stage valve, which is designed as a seat valve 51a. Naturally, a rotary disk valve as illustrated in FIG. 1a can also be used. As a function of the opening position of the seat valve 51a, the pressure which builds up exerts a closing force on the main stage valve body 21a. As a result of the configuration of the valve-opening and valve-closing surfaces on the main stage valve body, corresponding to the description which refers to FIG. 1c, a throttle cross section is formed in the connecting passages and also in the work chamber 35 which exerts a damping force on the main valve.

The bypass flow flows via the antechamber 23b and the radial flow connection 25b into the control chamber 19b, and empties via the main stage valve body 21b in the work chamber 35. The flow during compression damping, when the damping medium flows through the damping valve device 1 from the work chamber 35 into the work chamber 33, takes place via these same chambers and this same connection in the opposite flow direction for the bypass flow and the main flow.

In the left half of the drawing, the main stage valve bodies have directionally-dependent transmission valves 103a, 103b, each of which has at least one throttle cross section 105a, 105b, which act in the inflow direction of the corresponding control chambers. In the outflow direction out of the control chambers, the transmission valves, which are formed by spring plates, lift up from their seat surfaces, and release a larger cross section through the main stage valve bodies 21a/21b. As a result, the throttle cross section in the inflow direction in one of the control chambers 19 is smaller than in the outflow direction, in relation to a through flow direction of the damping valve device.

The transmission valves 103a/b, as indicated in the description of the function relating to the right half of the drawing, are not necessary, but they are appropriate for applications in which it is particularly difficult to tune the damping force. The ratio of the throttle cross section, e.g. 105a, in the inflow direction into the control chamber 19a, to the outflow cross section out of the control chamber 19b, is a yardstick for the variability of the damping force by the pilot valve. This ratio is also effective in the reverse flow direction.

Figure 10:
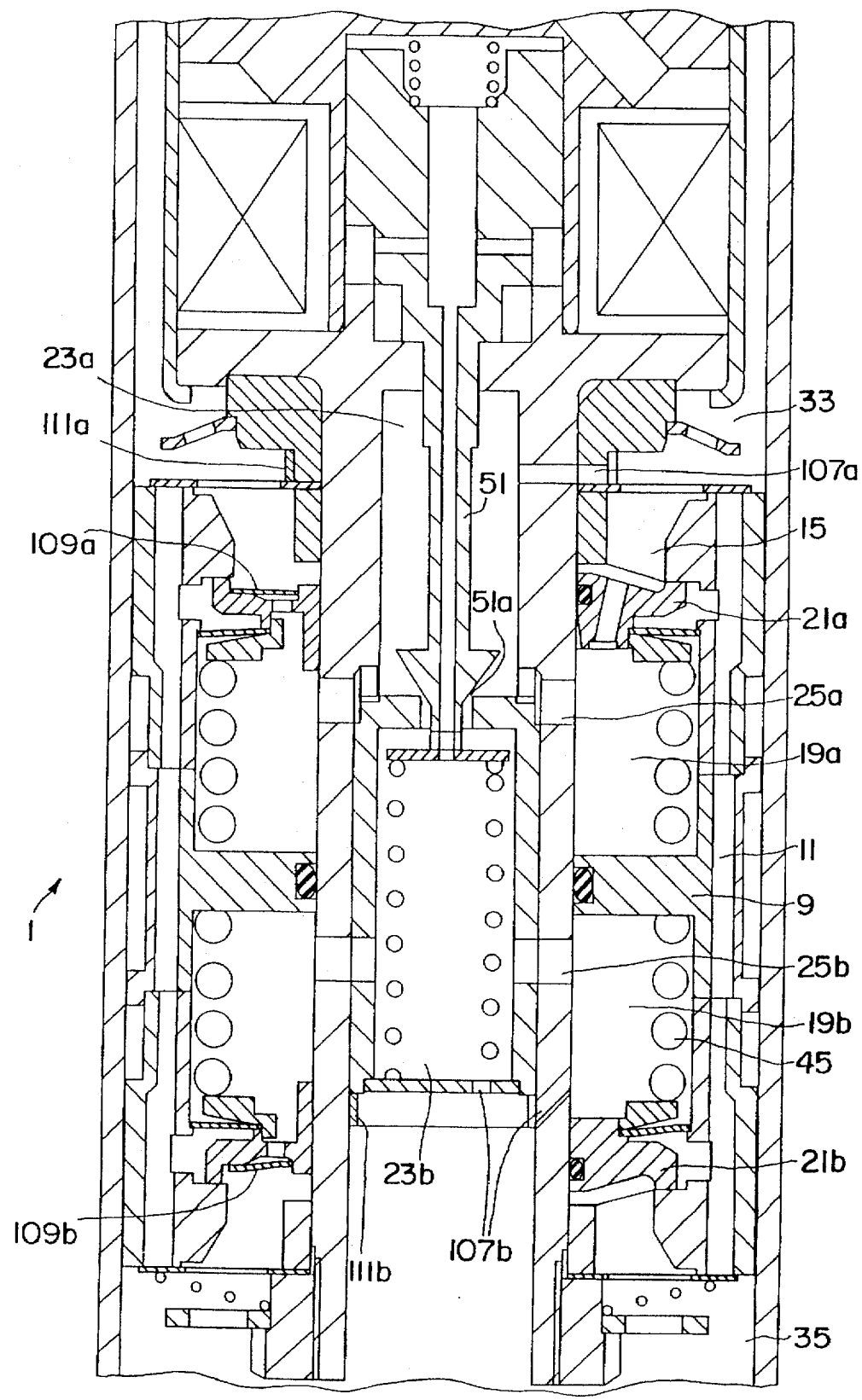

FIG. 10 is essentially exactly like the realization illustrated in FIG. 9, except for the configuration of the main stage valve bodies. There are different throttle cross sections 107a/107b, which transmit the bypass current to the pilot stage valve separately from the main stage valves 21a/21b. To adjust the ratio of the cross sections for the bypass current in the inflow and outflow direction of the control chambers 19a/19b, simple non-return valves 109a/109b are used. Alternatively, a retaining ring, similar to the retaining ring 37a illustrated in FIG. 6 can be used instead of the non-return valves 109a/109b. The retaining ring 111a/111b can thereby be realized so that it has a smaller transmission cross section in the inflow direction than in the output direction into the antechamber 23a or the control chamber 19b, with the advantage that the main stage valve bodies 21a/21b can be realized as solid bodies.

For both versions illustrated in FIGS. 9 and 10, the sleeve forming the antechamber 23a/23b is rigidly connected to neck of the piston rod. The antechambers 23a/23b, with the respective control chambers 19a/19b, form a common hydraulic action chamber, since the cross sections of the radial flow connections 25a/25b in relation to the other bypass current cross sections are realized so that essentially the same operating pressure is set in the antechambers/control chambers which effectively correspond to one another.

Further discussion of peripheral features, which the present invention may utilize, and not otherwise found herein, may be found in commonly assigned and copending U.S. patent application Ser. No. 08/214,615, which is hereby incorporated by reference as if set forth in its entirety herein.

One feature of the invention resides broadly in the vibration damper with adjustable damping force, comprising a pressure tube filled with damping medium, in which a piston on an axially movable piston rod divides a work chamber into a chamber closer to the piston rod and a chamber farther from the piston rod, whereby there is a flow of damping medium between the two work chambers, which flow is divided into a main stream and side stream, a damping valve device consisting of a damping valve body with one main damping valve in each direction of flow, each of which is formed by a main stage valve body and a pilot stage valve which actuates the main stage valves, an adjustable actuator which controls a flow connection between a control chamber and a work chamber, and the main stage valve carries the flow of the main stream and the pilot stage valve carries the flow of the side stream in both directions of flow, characterized by the fact that the side stream in the pilot stage valve flows through a non-return valve system 131a/b, that the pilot stage valve has two control cross sections 139a/b which can be controlled in alternation, and the side stream, as a function of the direction of flow, passes a control cross section and a non-return valve which opens in the direction of flow.

Another feature of the invention resides broadly in the vibration damper characterized by the fact that the control cross section 139a/b of the pilot valve is formed by a seat surface 155a/b in combination with a cone surface 153a/b, and there is an additional flow cross section 159 connected to the control cross section 139a/b.

Yet another feature of the invention resides broadly in the vibration damper characterized by the fact that the flow cross section can be adjusted by means of the actuator travel.

Still another feature of the invention resides broadly in the vibration damper characterized by the fact that between the two control cross sections there is a flow connection to the non-return valves, so that two partial lengths of the flow cross section are formed, each of which is active as a function of the direction.

A further feature of the invention resides broadly in the vibration damper characterized by the fact that the two partial lengths of the flow cross sections have different shapes.

Another feature of the invention resides broadly in the vibration damper characterized by the fact that each of the two flow cross sections can be adjusted within their partial lengths as a function of the actuator travel.

Yet another feature of the invention resides broadly in the vibration damper characterized by the fact that in an intermediate actuator position, both control cross sections 139a/b are disengaged, and depending on the sizing, the flow cross section 159 provides the desired damping force adjustment.

Still another feature of the invention resides broadly in the vibration damper characterized by the fact that the damping valve device is set to a hard damping characteristic in the electrically currentless position in the decompression direction, and to a soft damping characteristic in the compression direction.

A further feature of the invention resides broadly in the vibration damper characterized by the fact that the side stream, after flowing through one of the non-return valves 131a/b, continues into the control chamber 119a/b.

Yet a further feature of the invention resides broadly in a vibration damper/shock absorber with adjustable damping force, comprising a pressure tube filled with damping medium, in which a piston on an axially movable piston rod divides a work chamber into a piston-side and a non piston-side chamber, whereby there is a damping medium flow between the two work chambers, which is divided into a main flow and a bypass flow, a damping valve device consisting of a damping valve body, with a main stage valve for each flow direction, each of which is formed by a main stage valve body, and a pilot stage valve which activates the main stage valve, an adjustable actuator, which controls a flow connection between the control chamber and a work chamber, wherein the control chamber is limited axially by the first and second spring-loaded main stage valve bodies whereby the first main stage valve body, during the inflow from the closed valve position into an open position, is moved axially into the control chamber toward the second main stage valve body, which is held in the closed valve position by the damping medium, and when the inflow is in the reverse direction, the second main stage valve body is moved out of the closed valve position into an open position, axially toward the first main valve stage body which is in the closed valve position; characterized by the fact that the side stream in the pilot stage valve flows through a non-return valve system, that the pilot stage valve has two control cross sections which can be controlled in alternation, and the side stream, as a function of the direction of flow, passes a control cross section and a non-return valve which opens in the direction of flow.

Examples of electromagnetic valve arrangements with armatures, and associated components, including ring magnets, which may be utilized in accordance with the embodiments of the present invention, may be found in the following U.S. Pat. No. 5,265,703, which issued to Ackermann on Nov. 30, 1993; U.S. Pat. No. 5,180,039, which issued to Axthammer et al. on Jan. 19, 1993; U.S. Pat. No. 4,899,996, which issued to Maassen et al. on Feb. 13, 1990; U.S. Pat. No. 4,850,460, which issued to Knecht et al. on Jul. 25, 1989; and U.S. Pat. No. 4,785,920, which issued to Knecht et al. on Nov. 22, 1988.

Examples of shock absorbers, and components associated therewith, which may be utilized in accordance with the embodiments of the present invention, may be found in the U.S. Patents listed immediately above.

Examples of rotary valve arrangements, and components associated therewith, such as torque motors, which may be utilized in accordance with the embodiments of the present invention, may be found in the following U.S. Pat. No. 5,207,774, which issued to Wolfe et al. on May. 4, 1993; U.S. Pat. No. 5,160,162, which issued to Mouri et al. on Nov. 3, 1992; U.S. Pat. No. 5,087,868, which issued to Ishibashi et al. on Feb. 11, 1992; U.S. Pat. No. 4,776,437, which issued to Ishibashi et al. on Oct. 11, 1988; and U.S. Pat. No. 4,754,855, which issued to Kuwana et al. on Jul. 5, 1988.

A discussion of the "skyhook" principle may be found in U.S. Pat. No. 5,199,737, which issued to Huang on Apr. 6, 1993, as well as in commonly assigned and copending U.S. patent application Ser. No. 08/214,615.

In recapitulation, it will be appreciated that the present invention, in accordance with at least one preferred emboidment, may generally be directed to a vibration damper with adjustable damping force, comprising a pressure tube filled with damping medium, in which a piston on an axially movable piston rod divides a work chamber into a chamber closer to the piston rod and a chamber farther from the piston rod, whereby there is a flow of damping medium between the two work chambers, which flow is divided into a main stream and side stream, a damping valve device consisting of a damping valve body with one main damping valve in each direction of flow, each of which is formed by a main stage valve body and a pilot stage valve which actuates the main stage valves, an adjustable actuator which controls a flow connection between a control chamber and a work chamber, and the main stage valve carries the flow of the main stream and the pilot stage valve carries the flow of the side stream in both directions of flow;

such as a vibration damper/shock absorber with adjustable damping force, comprising a pressure tube filled with damping medium, in which a piston on an axially movable piston rod divides a work chamber into a piston-side and a non piston-side chamber, whereby there is a damping medium flow between the two work chambers, which is divided into a main flow and a bypass flow, a damping valve device consisting of a damping valve body, with a main stage valve for each flow direction, each of which is formed by a main stage valve body, and a pilot stage valve which activates the main stage valve, an adjustable actuator, which controls a flow connection between the control chamber and a work chamber, wherein the control chamber is limited axially by the first and second spring-loaded main stage valve bodies whereby the first main stage valve body, during the inflow from the closed valve position into an open position, is moved axially into the control chamber toward the second main stage valve body, which is held in the closed valve position by the damping medium, and when the inflow is in the reverse direction, the second main stage valve body is moved out of the closed valve position into an open position, axially toward the first main valve stage body which is in the closed valve position;

characterized by the fact that the side stream in the pilot stage valve flows through a non-return valve system, that the pilot stage valve has two control cross sections which can be controlled in alternation, and the side stream, as a function of the direction of flow, passes a control cross section and a non-return valve which opens in the direction of flow.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Corresponding foreign patent publication applications, namely, Federal Republic of Germany Patent Application No. P 44 23 526.7, filed on Jul. 7, 1994, having inventor Andreas Förster, and DE-OS P 44 23 526.7 and DE-PS P 44 23 526.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Further, the other corresponding foreign patent publication applications, namely, Federal Republic of Germany Patent Application No. 43 08 603, filed on Mar. 18, 1993, Federal Republic of Germany Patent Application No. 44 06 373, filed on Feb. 26, 1994, and Federal Republic of Germany Patent Application No. 44 06 918, all having inventor Andreas Förster, as well as DE-OS 43 08 603, DE-PS 43 08 603, DE-OS 44 06 373, DE-PS 44 06 373, DE-OS 44 06 918 and DE-PS 44 06 918, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber comprising:
a cylinder defining a chamber therein, said cylinder containing a damping fluid;
a piston rod sealingly projecting into said cylinder and being axially displaceable with respect to said cylinder;
a piston being attached to said piston rod, said piston being slidably disposed within said cylinder to sealingly divide said cylinder into first and second chambers;
means for permitting fluid communication between said first and second chambers;
said means for permitting fluid communication being disposed in at least a portion of said piston, said means for permitting fluid communication comprising:
a first spring-loaded main stage valve body;
a second spring-loaded main stage valve body;
a control chamber being defined between said first main stage valve body and said second main stage valve body;
first inlet means for directing fluid from said first chamber to said control chamber through said first main stage valve body upon axial displacement of said piston in a first direction;
second inlet means for directing fluid from said second chamber to said control chamber through said second main stage valve body upon axial displacement of said piston in a second direction, the second direction being opposite the first direction;
means for permitting axial displacement of:
said first main stage valve body towards said second main stage valve body during flow of damping fluid through said first inlet means; and
said second main stage valve body towards said first main stage valve body during flow of damping fluid through said second inlet means;
said first chamber being disposed adjacent said piston rod;
said second chamber being disposed further away from said piston rod than is said first chamber;
said means for permitting fluid communication between said first and second chambers comprising:
means for dividing the damping medium into a main flow and a side flow;
a damping valve device, said damping valve device comprising:
a damping valve body and first and second main stage valves;
said first main stage valve comprising said first main stage valve body;
said second main stage valve comprising said second main stage valve body; and
a pilot stage valve configured for activating said first and second main stage valves, said pilot stage valve comprising said means for permitting axial displacement of said first main stage valve body and said second main stage valve body;
outlet means for directing damping fluid between said control chamber and said first and second chambers; and
actuator means for adjustably controlling the flow of damping fluid through said outlet means.

2. The shock absorber according to claim 1, wherein:
said pilot stage valve comprises:
a non-return valve arrangement, said non-return valve arrangement comprising at least one non-return valve;
a pair of control cross-sections having means for being controlled in alternation with respect to one another;
said pilot stage valve is configured to permit the side flow, as a function of the direction of the side flow, to pass one of said control cross-sections and one said non-return valve; and
said one non-return valve being configured to open in the direction of the side flow upon passing of the side flow therethrough.

3. The shock absorber according to claim 2, wherein:
said pilot stage valve comprises:
a first seat surface and a first cone surface;
said first seat surface and said first cone surface being engageable with one another to form a first of said control cross-sections;
a second seat surface and a second cone surface;
said second seat surface and said second cone surface being engageable with one another to form a second of said control cross-sections; and
an additional flow cross-section being in fluid communication with said control cross-sections.

4. The shock absorber according to claim 3, wherein:

said actuator means has means for being adjustably displaced to adjust said additional flow cross section, said additional flow cross section being adjustable by means of displacement of said means for being adjustably displaced.

5. The shock absorber according to claim 4, wherein:

said at least one non-return valve comprises two non-return valves, one of said two non-return valves being configured to open upon flowing of the side flow in a first direction, the other of said two non-return valves being configured to open upon flowing of the side flow in a second direction, the second direction of side flow being substantially opposite the first direction of side flow;

said pilot stage valve further comprises a flow connection providing fluid communication to said non-return valves, said flow connection being disposed between said pair of control cross-sections; and said flow connection forming two partial lengths of said additional flow cross section, each of said two partial lengths being active as a function of the direction of the side flow.

6. The shock absorber according to claim 5, wherein said two partial lengths of said additional flow cross section are shaped differently with respect to one another.

7. The shock absorber according to claim 6, wherein:

said means for being adjustably displaced comprises means for adjusting, via displacement of said means for being adjustably displaced, each one of said two partial lengths of said additional flow cross section to adjust a portion of said additional flow cross section within the respective partial lengths.

8. The shock absorber according to claim 2, wherein:

said pilot stage valve comprises an additional flow cross section in fluid communication with said control cross sections;

said pilot stage valve comprises portions for engaging with one another to respectively control said pair of control cross sections in alternation;

said actuator means comprises means for being adjustably displaced, said means for being adjustably displaced comprising at least part of said portions for engaging with one another; and said means for being adjustably displaced is displaceable into an intermediate position, in which neither of said pair of control cross sections are engaged, and in which said additional flow cross section, on the basis of its sizing, provides the desired damping force adjustment.

9. The shock absorber according to claim 2, wherein:

said actuator means comprises:

means for being adjustably displaced to adjustably control the flow of damping fluid through said outlet means;

a coil arrangement; and an armature for being displaced in response to activation of said coil arrangement, said armature comprising said means for being adjustably displaced;

said shock absorber has a decompression direction and a compression direction; and with said armature being in a position with said coil arrangement being electrically deactivated:

said damping valve device is set to a hard damping characteristic in the decompression direction; and said damping valve device is set to a soft damping characteristic in the compression direction.

10. The shock absorber according to claim 2, wherein said pilot stage valve is configured to permit the side flow to continue into said control chamber upon the side flow flowing through one said non-return valve.

11. The shock absorber according to claim 4, wherein:

said pilot stage valve comprises portions for engaging with one another to respectively control said pair of control cross sections in alternation;

said actuator means comprises means for being adjustably displaced, said means for being adjustably displaced comprising at least part of said portions for engaging with one another; and said means for being adjustably displaced is displaceable into an intermediate position, in which neither of said pair of control cross sections are engaged, and in which said additional flow cross section, on the basis of its sizing, provides the desired damping force adjustment.

12. The shock absorber according to claim 4, wherein:

said additional flow cross section comprises two partial lengths of said additional flow cross section;

said means for being adjustably displaced comprises means for adjusting, via displacement of said means for being adjustably displaced, each one of said two partial lengths of said additional flow cross section to adjust a portion of said additional flow cross section within the respective partial lengths.

13. A shock absorber comprising:

a cylinder defining a chamber therein, said cylinder containing a damping fluid;

a piston rod sealingly projecting into said cylinder and being axially displaceable with respect to said cylinder;

a piston being attached to said piston rod, said piston being slidably disposed within said cylinder to sealingly divide said cylinder into first and second chambers;

means for permitting fluid communication between said first and second chambers;

said means for permitting fluid communication being disposed in at least a portion of said piston, said means for permitting fluid communication comprising:

means for dividing the damping medium into a main flow and a side flow;

a first spring-loaded main stage valve body;

a second spring-loaded main stage valve body;

a control chamber being defined between said first main stage valve body and said second main stage valve body;

first inlet means for directing fluid from said first chamber to said control chamber through said first main stage valve body upon axial displacement of said piston in a first direction;

second inlet means for directing fluid from said second chamber to said control chamber through said second main stage valve body upon axial displacement of said piston in a second direction, the second direction being opposite the first direction;

means for permitting axial displacement of:

said first main stage valve body towards said second main stage valve body during flow of damping fluid through said first inlet means; and said second main stage valve body towards said first main stage valve body during flow of damping fluid through said second inlet means;

said means for permitting fluid communication between said first and second chambers comprising a pilot stage valve configured for activating said first and second main stage valve bodies, said pilot stage valve comprising said means for permitting axial displacement of said first main stage valve body and said second main stage valve body;

said pilot stage valve comprising:
a non-return valve arrangement, said non-return valve arrangement comprising at least one non-return valve;
a pair of control cross-sections having means for being controlled in alternation with respect to one another;
said pilot stage valve being configured to permit the side flow, as a function of the direction of the side flow, to pass one of said control cross-sections and one said non-return valve; and
said one non-return valve being configured to open in the direction of the side flow upon passing of the side flow therethrough.

14. The shock absorber according to claim 13, wherein:
said pilot stage valve comprises:
a first seat surface and a first cone surface;
said first seat surface and said first cone surface being engageable with one another to form a first of said control cross-sections;
a second seat surface and a second cone surface;
said second seat surface and said second cone surface being engageable with one another to form a second of said control cross-sections; and
an additional flow cross-section being in fluid communication with said control cross-sections; said shock absorber further comprises:
outlet means for directing damping fluid between said control chamber and said first and second chambers; and
actuator means for adjustably controlling the flow of damping fluid through said outlet means;
said actuator means has means for being adjustably displaced to adjust said additional flow cross section, said additional flow cross section being adjustable by means of displacement of said means for being adjustably displaced;
said at least one non-return valve comprises two non-return valves, one of said two non-return valves being configured to open upon flowing of the side flow in a first direction, the other of said two non-return valves being Configured to open upon flowing of the side flow in a second direction, the second direction of side flow being substantially opposite the first direction of side flow;
said pilot stage valve further comprises a flow connection providing fluid communication to said non-return valves, said flow connection being disposed between said pair of control cross-sections;
said flow connection forming two partial lengths of said additional flow cross section, each of said two partial lengths being active as a function of the direction of the side flow;
said two partial lengths of said additional flow cross section are shaped differently with respect to one another; and
said means for being adjustably displaced comprises means for adjusting, via displacement of said means for being adjustably displaced, each one of said two partial lengths of said additional flow cross section to adjust a portion of said additional flow cross section within the respective partial lengths.

15. The shock absorber according to claim 13, wherein:
said pilot stage valve comprises portions for engaging with one another to respectively control said pair of control cross sections in alternation;
said pilot stage valve further comprises an additional flow cross section being in fluid communication with said control cross sections;
said shock absorber further comprises:
outlet means for directing damping fluid between said control chamber and said first and second chambers; and
actuator means for adjustably controlling the flow of damping fluid through said outlet means;
said actuator means comprises means for being adjustably displaced, said means for being adjustably displaced comprising at least part of said portions for engaging with one another;
said means for being adjustably displaced is displaceable into an intermediate position, in which neither of said pair of control cross sections are engaged, and in which said additional flow cross section, on the basis of its sizing, provides the desired damping force adjustment;
said actuator means comprises:
a coil arrangement; and
an armature for being displaced in response to activation of said coil arrangement, Said armature comprising said means for being adjustably displaced;
said shock absorber has a decompression direction and a compression direction;
with said armature being in a position with said coil arrangement being electrically deactivated:
said damping valve device is set to a hard damping characteristic in the decompression direction; and
said damping valve device is set to a soft damping characteristic in the compression direction; and
said pilot stage valve is configured to permit the side flow to continue into said control chamber upon the side flow flowing through one said non-return valve.

16. A shock absorber comprising:
a cylinder defining a chamber therein, said cylinder containing a damping fluid;
a piston rod sealingly projecting into said cylinder end being axially displaceable with respect to said cylinder;
a piston being attached to said piston rod, said piston being slidably disposed within said cylinder to sealingly divide said cylinder into first and second chambers;
means for permitting fluid communication between said first and second chambers;
said means for permitting fluid communication being disposed in at least a portion of said piston, said means for permitting fluid communication comprising:
a first main stage valve body;
a second main stage valve body;
a control chamber being defined between said first main stage valve body and said second main stage valve body;
first inlet means for directing fluid from said first chamber to said control chamber through said first main stage valve body upon axial displacement of said piston in a first direction;
second inlet means for directing fluid from said second chamber to said control chamber through said second main stage valve body upon axial displacement of said piston in a second direction, the second direction being opposite the first direction;

a pilot stage valve configured for activating said first and second main stage valves;

said pilot stage valve comprising:

at least one non-return valve; and at least one control cross-section;

said pilot stage Valve being configured to permit the side flow to pass through at least a portion of each of:

said at least one non-return valve; and said at least one control cross-section; as a function of the direction of the side flow.

17. The shoo absorber according to claim 16, wherein:

said at least one control cross-section comprises a pair of control cross-sections having means for being controlled in alternation with respect to one another;

said at least a portion of said at least one non-return valve comprises one said non-return valve, and said at least a portion of said at least one control cross-section comprises one of said control cross-sections, such that said pilot stage valve is configured to permit the side flow, as a function of the direction of the side flow, to pass one of said control cross-sections and one said non-return valve; and said one non-return valve is configured to open in the direction of the side flow upon passing of the side flow therethrough.

18. Method of operating a shock absorber, the shock absorber comprising: a cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the cylinder into first and second chambers; the first chamber being disposed adjacent the piston rod and the second chamber being disposed further away from the piston rod than is the first chamber; said method comprising the steps of:

providing means for permitting fluid communication between the first and second chambers;

disposing the means for permitting fluid communication in at least a portion of the piston;

said step of providing the means for permitting fluid communication comprising the steps of:

providing a first spring-loaded main stage valve body;

providing a second spring-loaded main stage valve body;

defining a control chamber being between the first main stage valve body and the second main stage valve body;

providing first inlet means for directing fluid from the first chamber to the control chamber through the first main stage valve body upon axial displacement of the piston in a first direction;

providing second inlet means for directing fluid from the second chamber to the control chamber through the second main stage valve body upon axial displacement of the piston in a second direction, the second direction being opposite the first direction;

providing means for permitting axial displacement of the first main stage valve body towards the second main stage valve body during flow of damping fluid through the first inlet means;

providing means for permitting axial displacement of the second main stage valve body towards the first main stage valve body during flow of damping fluid through the second inlet means;

providing means for dividing the damping medium into a main flow and a side flow;

providing a damping valve device; and said step of providing a damping valve device comprising the steps of:

providing a damping valve body and first and second main stage valves, the first main stage valve comprising the first main stage valve body, and the second main stage valve comprising the second main stage valve body; and providing a pilot stage valve configured for activating the first and second main stage valves, the pilot stage valve comprising the means for permitting axial displacement of the first main stage valve body and the second main stage valve body;

said method further comprising the additional steps of:

displacing the piston in the first direction;

performing the following steps during displacement of the piston in the first direction:

directing fluid, with the first inlet means, from the first chamber to the control chamber through the first main stage valve body; and axially displacing the first main stage valve body towards the second main stage valve body;

said step of axially displacing the first main stage valve body comprising the step of activating the first main stage valve with the pilot stage valve by permitting axial displacement of the first main stage valve body;

displacing the piston in the second direction;

performing the following steps during displacement of the piston in the second direction:

directing fluid, with the second inlet means, from the second chamber to the control chamber through the second main stage valve body; and axially displacing the second main stage valve body towards the first main stage valve body;

said step of axially displacing the second main stage valve body comprising the step of activating the second main stage valve with the pilot stage valve by permitting axial displacement of the second main stage valve body;

providing outlet means for directing damping fluid between the control chamber and the first and second chambers; and providing actuator means for adjustably controlling the flow of damping fluid through the outlet means.

* * * * *

UNITED STATES PATENT AND TRADEMARK OFFICE
CERTIFICATE OF CORRECTION

PATENT NO. : 5,699,885
DATED : December 23, 1997
INVENTOR(S) : Andreas FÖRSTER

It is certified that error appears in the above-identified patent and that said Letters Patent is hereby corrected as shown below:

In column 24, line 5, Claim 11, after 'Claim', delete "4," and insert --3--.

In column 26, line 43, Claim 16, after 'cylinder', delete "end" and insert --and--.

In column 27, line 11, Claim 17, after "The', delete "shoo" and insert --shock--.

Signed and Sealed this

Seventeenth Day of August, 1999

Attest:

Q. TODD DICKINSON

*Attesting Officer*     *Acting Commissioner of Patents and Trademarks*